(12) United States Patent
Greetham

(10) Patent No.: US 9,633,030 B2
(45) Date of Patent: Apr. 25, 2017

(54) DATA ANALYSIS AND REPORTING TOOL

(71) Applicant: David Greetham, Houston, TX (US)

(72) Inventor: David Greetham, Houston, TX (US)

(73) Assignee: RICOH COMPANY, LTD., Tokyo (JP)

( * ) Notice: Subject to any disclaimer, the term of this patent is extended or adjusted under 35 U.S.C. 154(b) by 257 days.

(21) Appl. No.: 14/634,498

(22) Filed: Feb. 27, 2015

(65) Prior Publication Data

US 2016/0253349 A1   Sep. 1, 2016

(51) Int. Cl.
*G06F 3/048* (2013.01)
*G06F 17/30* (2006.01)

(52) U.S. Cl.
CPC .. *G06F 17/30126* (2013.01); *G06F 17/30091* (2013.01)

(58) Field of Classification Search
CPC ............. G06F 17/30126; G06F 17/30091
USPC .......................................................... 715/748
See application file for complete search history.

(56) References Cited

U.S. PATENT DOCUMENTS

| | | |
|---|---|---|
| 2002/0133522 A1 | 9/2002 | Greetham et al. |
| 2005/0066190 A1 | 3/2005 | Martin |
| 2010/0241977 A1 | 9/2010 | Greetham |
| 2013/0091175 A1 | 4/2013 | Richards et al. |
| 2013/0218940 A1 | 8/2013 | Shannon et al. |
| 2016/0253346 A1 | 9/2016 | Greetham et al. |
| 2016/0253347 A1 | 9/2016 | Greetham et al. |

OTHER PUBLICATIONS

European Patent Office, "Search Report" in application No. 16156700.3-1507, dated Jul. 25, 2016, 8 pages.

*Primary Examiner* — William Titcomb
(74) *Attorney, Agent, or Firm* — Hickman Palermo Becker Bingham LLP

(57) ABSTRACT

An approach is provided for a data analysis and reporting. A data collection manager generates a graphical user interface (GUI) and displays the GUI on a display of a client device. The GUI includes a plurality of dialog boxes for receiving one or more user inputs. The data collection manager receives one or more file type selections via one or more first dialog boxes, and one or more target selections via one or more second dialog boxes, and then generates and deploys a collector. The collector is configured to: selectively determine one or more data files that have certain characteristics specified by the one or more file type selections and that are hosted on one or more target devices specified by the one or more target selections; collect the one or more data files from the target devices; and store the one or more data files in a network server.

20 Claims, 27 Drawing Sheets

| Data File Formats | Hexadecimal Signatures | ISO 8859-1 Signatures |
|---|---|---|
| jpg, jpeg | FF D8 FF E0 | ÿØÿà |
| exe | 4D 5A | MZ |
| tif, tiff | 49 49 2A 00 (little endian format) or 4D 4D 00 2A (big endian format) | II*. or MM.* |
| mp3 | 49 44 33 | ID3 |
| ftxt, txt, iff | 46 4F 52 4D nn nn nn nn 46 54 58 54 | FORM....FTXT |
| psd (Photoshop) | 38 42 50 53 | 8BPS |
| pdf | 25 50 44 46 | %PDF |
| doc, xls, ppt | D0 CF 11 E0 A1 B1 1A E1 | - |
| zip, jar, odt, ods, odp, docx, xlsx, pptx, apk | 50 4B 03 04, 50 4B 05 06 (empty archive) or 50 4B 07 08 (spanned archive) | PK.. |

910 — Data File Formats
920 — Hexadecimal Signatures
930 — ISO 8859-1 Signatures

Report by Signature — 1/28/2015 6:05:23 PM

| File Signature | File Category | File Count | File Size (B) | File Size (MB) |
|---|---|---|---|---|
| .ASD | Program Data | 3 | 1632 | 0 |
| .DOC | Productivity Documents | 3 | 553984 | 0.53 |
| .INI | Productivity Documents | 3 | 387 | 0 |
| .JPG | Graphics and Multimedia | 2 | 1353595 | 1.29 |
| .XLSX | User Data | 2 | 15064 | 0.01 |
| .XML | Program Data | 2 | 135424 | 0.13 |
| .XSL | User Data | 2 | 3277 | 0 |
| Total | | 17 | 2063363 | 1.97 |

DATA ANALYSIS AND REPORTING TOOL

FIELD

Embodiments relate generally to an approach for collecting electronic data and data files from target devices, and to reporting information about the collected data and files.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Current approaches for collecting electronic data from target systems have many limitations. One problem is that some conventional eDiscovery systems collect all data residing on computer resources even if some of the data is neither used nor requested. Relying on such systems may impede achieving proportionality between the cost of the eDiscovery and the amount of damages sought by claimants. For example, regardless of whether the amount of damages is in the range of thousands of dollars or millions of dollars, the cost of legal discovery performed using the conventional systems may be the same.

Another problem is that some conventional eDiscovery systems are configured to generate only encrypted hard drive maps that are difficult to browse and review. Other systems may store the collected data only in non-cloud-based storage systems, which have limited accessibility and capacity. In addition, many eDiscovery systems offer limited reporting functionality.

Moreover, since some systems may be configured to select electronic data files based only on extensions of the files, such selections may be inaccurate as users can easily modify the extensions. For example, if a request is to select those image JPEG files that have the *.jpg extension, then the image files that are in the JPEG format, but have their extensions modified to extensions other than *.jpg, may be excluded from the discovery.

Furthermore, some systems need to be implemented or installed onsite of the target system, and this may raise concerns about the integrity and security of the collected data. Also, accessing and using some of the systems may require specialized knowledge and experience, which may be unavailable in some situations. All the above may lead to an unsatisfactory user experience and concerns about security and efficiency of the data discovery process.

SUMMARY

One or more non-transitory computer-readable media storing instructions which, when processed by one or more processors, cause a data collection manager to generate a graphical user interface (GUI) and displaying the GUI on a display of a client device. The GUI includes a plurality of dialog boxes for receiving one or more user inputs. The data collection manager receives one or more file type selections via one or more first dialog boxes from the plurality of dialog boxes. The data collection manager also receives one or more target selections via one or more second dialog boxes from the plurality of dialog boxes, and then generates and deploys a collector. The collector is configured to selectively determine one or more data files that have certain characteristics specified by the one or more file type selections, and that are hosted on one or more target devices specified by the one or more target selections. The collector is also configured to collect the one or more data files from the one or more target devices and store the one or more data files in a network server.

BRIEF DESCRIPTION OF THE DRAWINGS

In the figures of the accompanying drawings like reference numerals refer to similar elements.

FIG. 9 depicts a table that contains examples of signature data.

FIG. 25 depicts an example report generated by a data analysis and reporting tool that shows a summary report organized by a signature.

FIG. 26 depicts an example report generated by a data analysis and reporting tool that shows a comma-separated-values (CSV) file.

DETAILED DESCRIPTION

Figure 1:
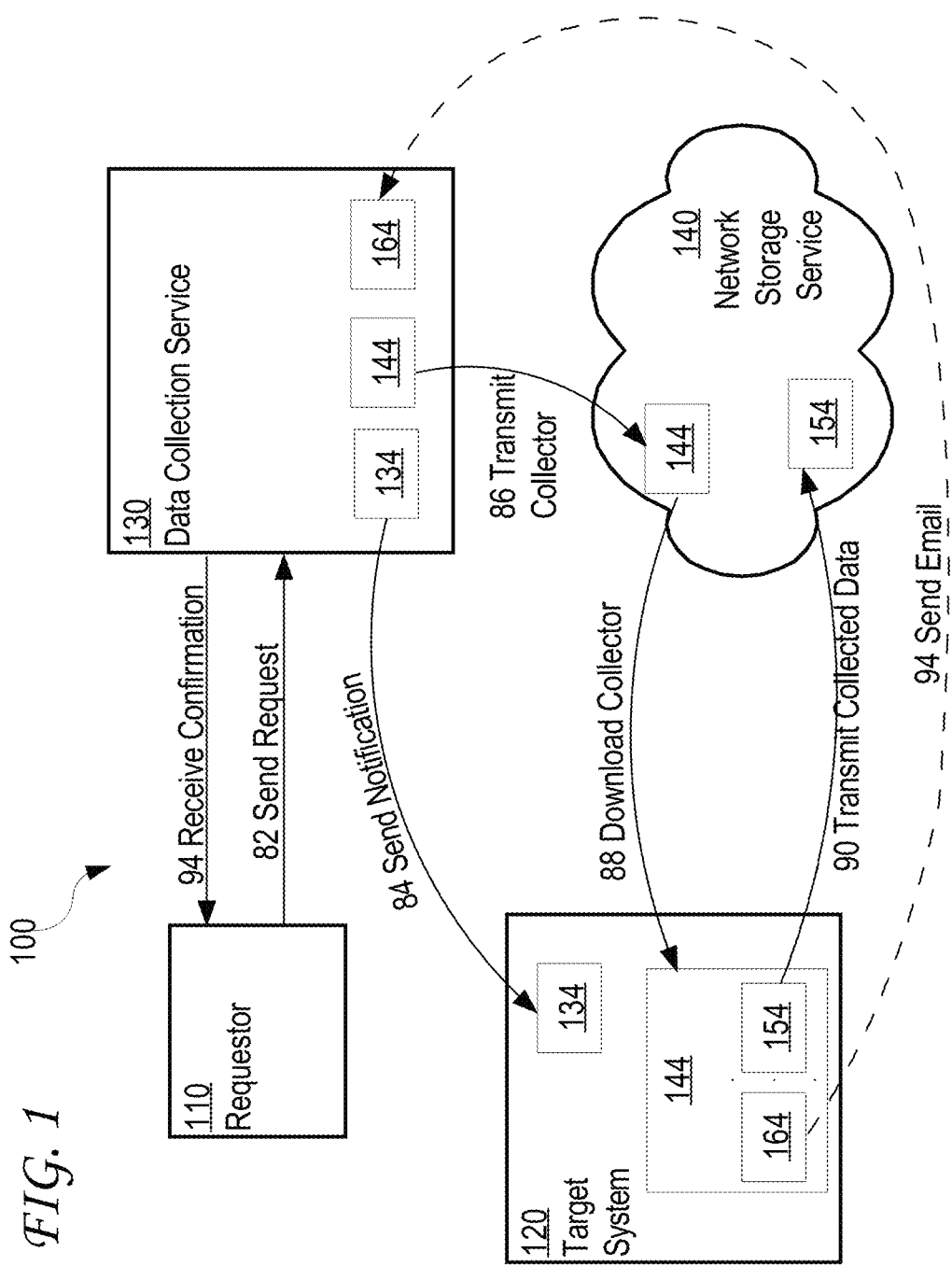
FIG. 1 is a block diagram that depicts an example arrangement for a data collection system architecture.

In the following description, for the purposes of explanation, numerous specific details are set forth in order to provide a thorough understanding of the present approach. It will be apparent, however, to one skilled in the art that embodiments may be practiced without these specific details. In other instances, well-known structures and devices are shown in block diagram form in order to avoid unnecessarily obscuring the embodiments. Various embodiments are described hereinafter in the following sections:

I. OVERVIEW
II. DATA COLLECTION SYSTEM ARCHITECTURE
   A. Requestor
   B. Requestor Implemented in a Mobile Device
   C. Data Collection Manager
   D. Data Collection Manager Implemented in a Mobile Device
   E. Target System
   F. Collector
   G. Network Storage Services
III. FILE SIGNATURES
IV. EXAMPLE WORKFLOW FOR COLLECTING DATA AND DATA FILES
V. EXPORTING COLLECTED DATA AND DATA FILES
VI. DATA ANALYSIS AND REPORTING TOOL
   A. Functionalities of a Data Analysis and Reporting Tool
   B. Example Workflow
VII. IMPLEMENTATION MECHANISMS I. Overview An approach is provided for enhancing the process of collecting electronic data and data files from target devices. The approach may be implemented in electronic data discovery applications. The examples included herein are provided merely for the purpose of explanation of some implementations of the approach, and are not to be viewed as limiting the scope of the presented approach. For instance, the examples included herein provided in the context of legal discovery or in the context of an audit process are not to be viewed as limiting the implementations of the approach to merely the law-related applications.

In an embodiment, an approach for enhancing the process of collecting electronic data and data files from target devices is implemented in a computer-implemented data collection manager which generates a collector configured to collect the data and files from the target devices. The collector may be configured to perform specialized searches of resources stored on the target computers of the involved parties. Settings for the specialized search and the types of requested reports may be provided via a graphical user interface of a dashboard implemented for example, as a data analysis and reporting tool.

In an embodiment, an approach for enhancing the process of eDiscovery allows maintaining proportionality between the cost of the discovery and the amount of the sought damages. By taking into consideration the amount of damages in determining the scope of the discovery, the cost of the discovery may be tailored to the amount that is reasonable to the involved parties. This allows avoiding situations where the cost of the legal discovery is disproportionally high to the amount of damages. The approach allows customizing the scope and cost of the search. For example, if the requested damages are relatively high, then the scope of the discovery may be relatively broad and comprehensive. However, if the requested damages are relatively low, then then the scope of the discovery may be relatively narrow and specialized.

In an embodiment, the proportionality between the cost of the discovery and the amount of the damages sought is maintained by implementing customization capabilities to the data collection process. Customization allows specifying the types of data and data files that the involved parties require. This allows avoiding situations in which more data and files is collected from the target systems than is needed, and in which the cost of collecting such data and files from the target systems becomes unreasonably high in light of the sought damages.

In an embodiment, an approach for enhancing the process of electronic data discovery allows engaging an independent data collection service to perform data collection in a secure and independent manner. For example, a data collection manager may be used to generate and deploy a computer-implemented-collector configured to collect data from a target system in the way that allows preserving the integrity and authenticity of the collected data, which may be critical in many aspects and for all involved parties.

In an embodiment, an approach for enhancing the process of data discovery is configured to utilize any type of storage media, including cloud resources. For example, once a data collection service receives from a requestor a request to collect data from a target system and generates a collector configured to collect the requested data and data files, the collector may be stored in a cloud network and downloaded from the cloud network to the target system. Once the requested data and data files are collected, they can be stored in the cloud network or any other network of servers.

In an embodiment, an approach for enhancing an electronic data discovery process allows identifying the data files to be collected based on unique signatures of the files. A unique signature may represent unique characteristics of the file, and may be embedded in the file. Using unique signatures of the files to identify the data files to be collected is more desirable than using file extensions included in the file names because the file extensions may not necessarily correspond to the actual type of the file. Since the file extensions, not the file signatures, can be modified by the user, collection based on the file signatures provides more accurate collection results than if the collection is performed based on the file extensions.

In an embodiment, an approach for enhancing an electronic data discovery process allows generating various types of reports for presenting information about the collected data and data files. Various filters may be applied to manage the amount of reporting data and to manage the amount of contents presented in the reports. The reports may be customized to provide relevant data selected from the collected data files.

In an embodiment, an approach for enhancing a discovery process provides a user interface for determining types of data files to be collected, target resources from which the data files are to be collected, storages on which the collected data files are to be stored, and types of reports to be prepared based on the collected data files. The interface may be implemented in a data analysis and reporting tool provided to the involved parties and users.

II. Data Collection System Architecture

Figure 2:
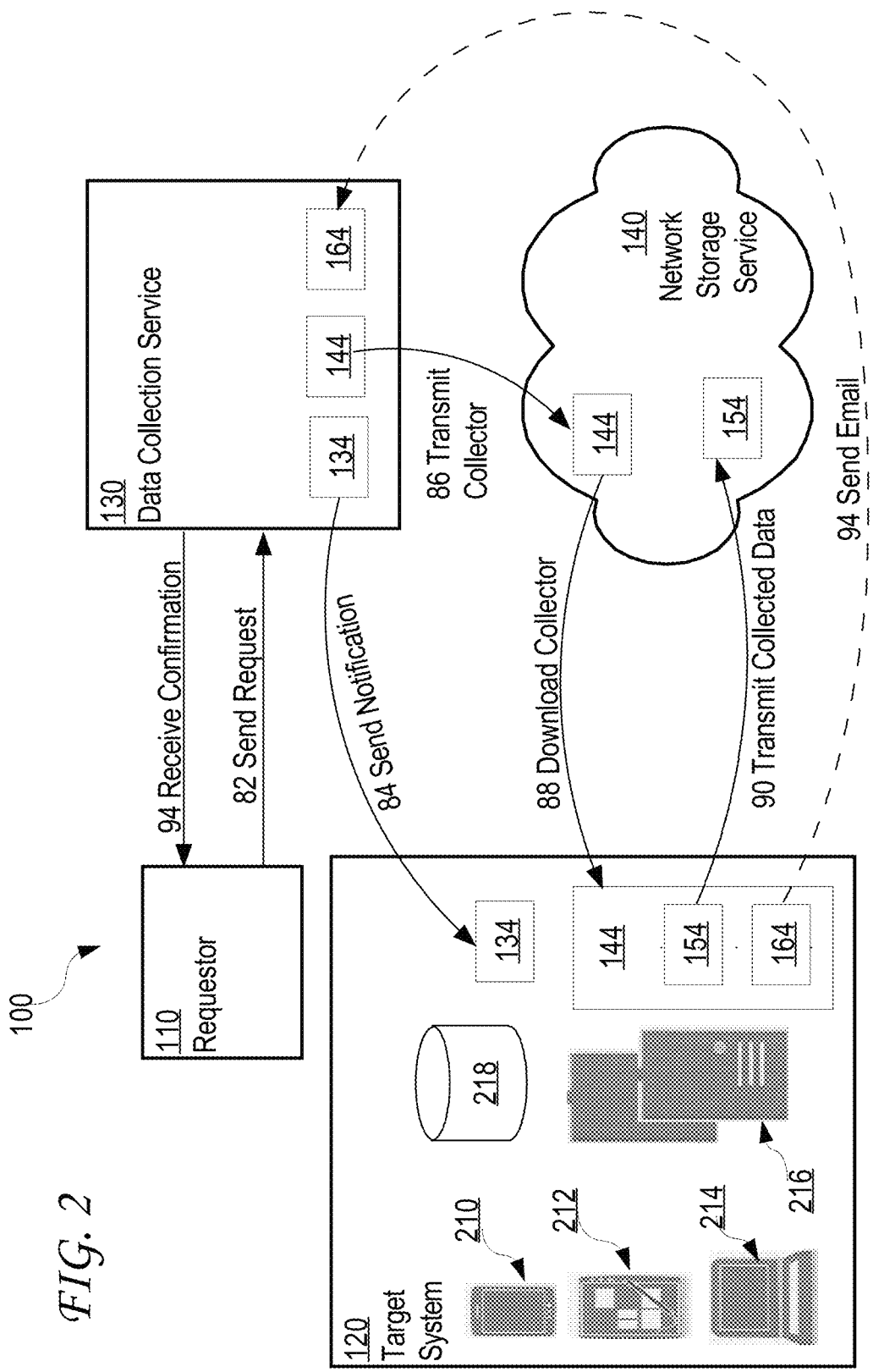
FIG. 2 is a block diagram that depicts an example arrangement for a data collection system architecture.
Figure 3:
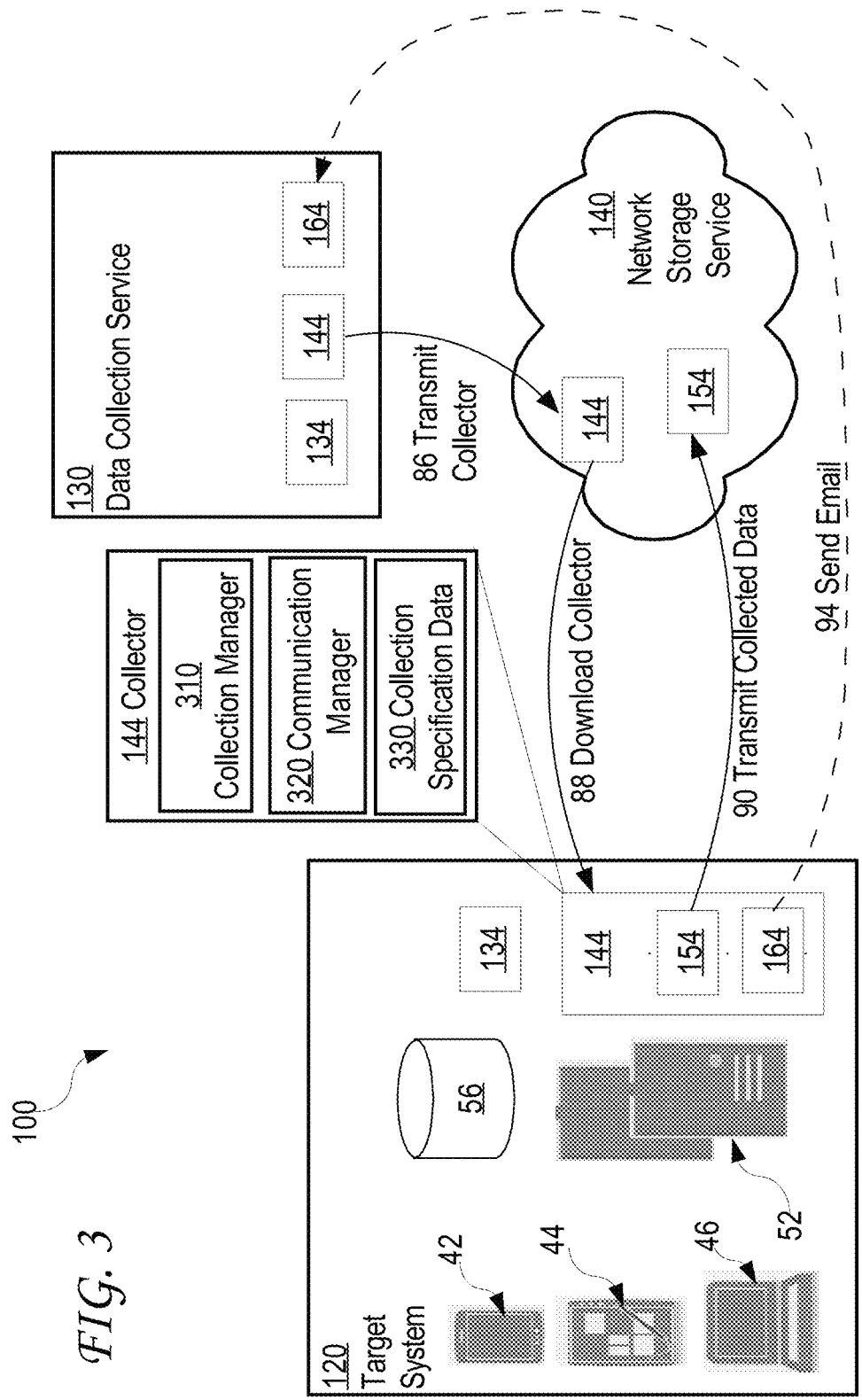
FIG. 3 is a block diagram that depicts an example arrangement for a data collection system architecture.

FIGS. 1-3 are block diagrams that depict an example arrangement 100 for a data collection system architecture. Embodiments are not limited to the example arrangement 100 depicted in FIGS. 1-3, and other example arrangements are described hereinafter. In the examples depicted in FIGS. 1-3, arrangement 100 includes a requestor system 110, a target system 120, a data collection service 130, and one or more network storage services 140. Requestor system 110 is also referred to herein as requestor 110.

Example arrangement 100 may be implemented in computer systems configured to perform any type of electronic data discovery. The examples included herein are provided merely for the purpose of explanation of some implementations of example arrangement 100, and are not to be viewed as limiting the implementation scope of arrangement 100.

Example arrangement 100 may include various types of communications links used to facilitate communications between requestor 110, target system 120, data collection service 130 and network storage services 140.

In an embodiment, requestor 110, target system 120, data collection service 130 and network storage services 140 are communicatively coupled with each other via communications links. Communications links may be established across any number of communications networks such as, for example, one or more Local Area Networks (LANs), Wide Area Networks (WANs), Ethernet networks or the Internet, and/or one or more terrestrial, satellite or wireless links. The types and configurations of network and communications links may vary depending upon a particular implementation.

A. Requestor

Requestor system (or requestor) 110 depicted in FIGS. 1-3 is a computer-based-system used by a user who requests collecting electronic data and data files from target system 120. Requestor 110 may use data collection service 130 to define and deploy a collector 144, which is configured to perform the electronic data discovery on target system 120.

Requestor 110 may be any type of client device, depending upon the particular implementation. Example client devices include, without limitation, personal or laptop computers, workstations, tablet computers, personal digital assistants (PDAs) and telephony devices such as smart phones. The client device may include applications including, for example, a Web browser and other client-side applications. A client device may include other elements, such as a user interface, one or more processors and memory, including volatile memory and non-volatile memory.

For example, requestor system 110 may be a computer system accessible to one or more users who are, or who represent, a claimant party. A claimant may be a plaintiff, a petitioner, a supplicant or any other party requesting any type of discovery of electronic data and data files residing on target system 120. In one implementation, a user of requestor system 110 may be a plaintiff bringing a suit against a defendant and requesting a legal discovery of electronic data stored on target system 120 owned by the defendant. In another implementation, a user of requestor system 110 may be a governmental agency performing an audit of electronic data and data files stored on target system 120 owned by an audited company.

Requestor system 110 may be implemented by hardware, computer software, or any combination of hardware and computer software. One non-limiting example implementation of requestor system 110 is a computer system hosting various applications and any type of electronic document data in any form, including structured data and unstructured data.

One or more users may access requestor system 110 and may specify the type of data and files to be collected from target system 120. Specifications provided by the users of requestor system 110 are also referred to as collection definition data. The users may communicate the specification of the type of data to be collected from target system 120 to data collection service 130 by sending (82) a request to data collection service 130. Data collection service 130 may process the request, generate a collector 144 configured to collect the specified data and data files from target system 120, store the collected data and files in network storage services 140, and inform data collection service 130 (and/or requestor 110) that the collected data has been stored. The collected data and files may be stored on network storage services 140 implemented in a cloud service or any other storage accessible to data collection service 130 and users of requestor 110.

Once the requested data and data files are collected from target system 120, users of requestor system 110 may receive (94) a confirmation from data collection service 130. Although depicted in the figures and described herein in the context of an email for purposes of explanation, the confirmation from data collection service 130 may be in any form that may vary depending upon a particular implementation. According to an alternative embodiment (not depicted in FIGS. 1-3), users of requestor system 110 may receive a confirmation from network storage services 140 or from collector 144. Upon receiving a confirmation from any source, users of requestor system 110 may launch an application that is configured to access the collected data and data files. The application may allow the users to view contents of the collected files, generate various types of reports created based on the contents of the collected files, view the reports and collected data filtered using various filters, and the like.

In an embodiment, a user of requestor 110 may be able to request and receive a report generated based on data and files that have been collected from target system 120. For example, a user may be able to access a data analysis and reporting tool, and request a customized report for viewing the collected data and files. Examples of the data analysis and report tool and examples of reports that can be generated by the tool are described in FIGS. 13-26.

B. Requestor Implemented in a Mobile Device

In an embodiment, requestor system 110 is a computer-based-system implemented in a mobile device. For example, requestor system 110 may be implemented in a mobile device such as a smart phone, a tablet, a portable computer, and the like. A user of the mobile device may invoke an application residing on the mobile device and use the application to requests collecting electronic data and data files from target system 120. A user of the mobile device implementing requestor 110 may use data collection service 130 to define and deploy a collector 144, which is configured to perform the electronic data discovery on target system 120, as described above.

C. Data Collection Service

Data collection service 130 is a computer-based-system used to receive requests for collecting data from target system 120 and to generate a collector configured to collect the requested data from target system 120. Data collection service 130 may be any type of client device. Example client devices include, without limitation, personal or laptop computers, workstations, tablet computers, personal digital assistants (PDAs), telephony devices such as smart phones, and the like. The client device may include applications including, for example, a Web browser and other client-side applications. The client device may include other elements, such as a user interface, one or more processors and memory, including volatile memory and non-volatile memory.

Figure 4:
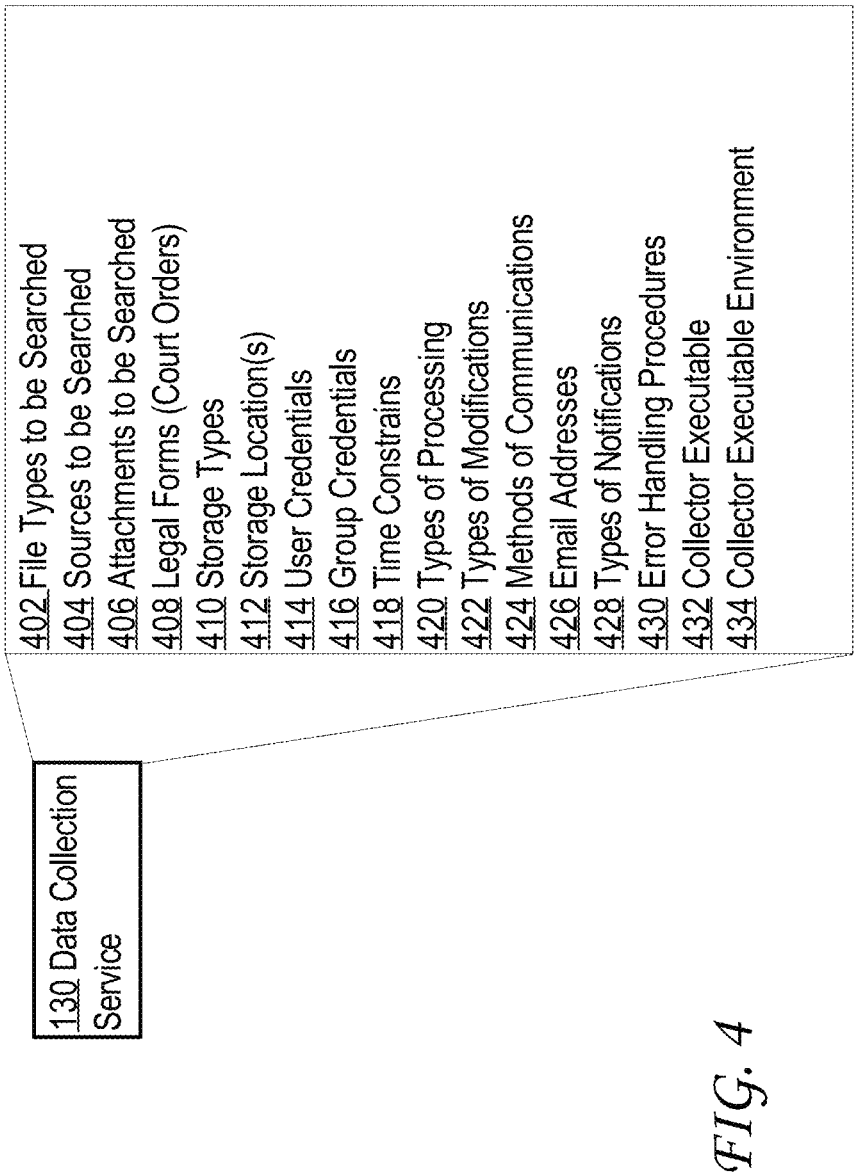
FIG. 4 is a block diagram that depicts examples of data collection services.

FIG. 4 is a block diagram that depicts examples of data collection services. The depicted examples are to be viewed as non-limited examples of the services that may be provided by data collection service 130. For example, data collection service 130 may be configured to specify 402 file types to be searched, specify 404 sources to be searched, specify 406 whether, or which, attachments are to be searched, and specify 408 whether legal forms, such as court orders and other legal documents, are to be included in legal discovery.

Furthermore, data collection service 130 may be configured to specify 410 storage types that are to be searched, and specify 412 storage locations that are to be searched or used to store collected data and data files.

Data collection service 130 may also be configured to retrieve and provide user credentials 414, group credentials 416 and other authentication information to be used by a collector to perform legal discovery.

Data collection service 130 may also be configured to specify 418 time constrains for performing legal discovery, specify 420 types of processing, specify 422 types of modifications (if any), specify 424 methods of communicating results of legal discovery, specify 426 email addresses to be used by a collector and/or a custodian, specify 428 types of notifications, specify 430 error handling procedures, and the like.

Moreover, data collection service 130 may be configured to specify 432 a hyperlink to a cloud data storage using which a collector may be downloaded onto target system 120, and specify 434 an execution environment for executing a collector. Other functionalities and capabilities may also be implemented in data collection service 130.

In an embodiment, data collection service 130 is configured to receive a request from a user of requestor 110. The request may provide instructions specifying the types of data and data files to be collected and instructions specifying the computer resources of target system 120 from which the data and files are to be collected.

Upon receiving the request, data collection service 130 may generate collector 144, and cause to transmit (86) collector 144 to network storage services 140 to cause storing collector 144 on a server managed by network storage services 140.

Data collection service 130 may also generate a notification 134 indicating that collector 144 has been deployed and stored in network storage services 140, and send (84) notification 134 to target system 120. Notification 134 may be implemented as any type of electronic message or communication. For example, notification 134 may be an electronic email that data collection service 130 generates and sends to a user of target system 120 to notify the user of target system 120 that target system is for example, in a litigation hold, and a court order has been issued to collect data and data files form target system 120. Notification 134 may include a copy of the court order, or a link to the copy of the court order.

Furthermore, notification 134 may include instructions for a user of target system 120 for accessing and downloading (88) collector 144 from network storage services 140 onto target system 120 to cause execution of collector 144 on target system 120. Furthermore, notification 134 may include an identification of the location at which collector 144 has been stored in network storage services 140. For example, notification 134 may include instructions stating "please select the hyperlink provided below to start a data collection process of the data and data files stored on your computer devices." Once a user of target system 120 selects the particular hyperlink, collector 144 may be downloaded (88) onto target system 120, and execution of collector 144 on target system 120 can start.

Execution of collector 144 on target system 120 may result in collecting data and data files from target system 120 specified by data collection service 130, and storing the collected data and data files at some location on network storage services 140.

Once collection of data and data files from target system 120 is completed, data collection service 130 may receive an electronic communication 164 from either target system 120 (as depicted in FIGS. 1-3) or from other sources (not depicted in FIGS. 1-3). Sending email 164 is optional. Email 164 may include an indication that the data and/or data files have been collected and stored in network storage services 140, such as a cloud service, a server managed by a service provider, and the like In an embodiment, a user of data collection service 130 may request and receive a report of data and files that have been collected from target system 120. For example, a user may access a data analysis and reporting tool, and request a customized report for viewing the collected data and files. An example of the data analysis and report tool and examples of reports that can be generated by the tool are described in FIGS. 13-26.

D. Data Collection Service Implemented in a Mobile Device

In an embodiment, data collection service 130 is a computer-based-system implemented in a mobile device. For example, data collection service 130 may be implemented in a mobile device such as a smart phone, a tablet, a portable computer, and the like. A user of the mobile device may invoke an application residing on the mobile device and use the application to receive requests for collecting electronic data and data files from target system 120. A user of the mobile device implementing data collection service 130 may use data collection service 130 to define and deploy collector 144 configured to perform the electronic data discovery on target system 120, send notifications to users of target system 120 and to users of requestor 110, and receive communications from target system 120, as described above.

E. Target System

Target system 120 is a computer-based-system that hosts data and data files that are to be collected. Target system 120 may include one or more computing devices and may be configured as a standalone system or a multi-unit computer system. For example, target system 120 may include only just one device, such as a workstation or a laptop. Alternatively, target system 120 may include a plurality of computer device communicatively coupled with each other via wireless or wired communications links.

Target system 120 may include one or more devices of any type. Example client devices include, without limitation, personal or laptop computers, workstations, tablet computers, personal digital assistants (PDAs) and telephony devices such as smart phones. The client devices may include applications including, for example, Web browsers and other client-side applications. The client devices may include other elements, such as a user interface, one or more processors and memory, including volatile memory and non-volatile memory.

FIG. 2 is block diagrams that depict an example arrangement 100 for data collection system architecture. In addition to the elements described above and depicted in FIG. 1, FIG. 2 depicts examples of user devices that may be included in target system 120. The example devices depicted in FIG. 2 are to be viewed as non-limiting examples of the devices, and have been provided to illustrate some of many user devices that may be used in the data collection approach.

Target system 120 depicted in FIG. 2 comprises a plurality of user devices, including one or more smart phones 210, one or more tablets 212, one or more computer workstations 214 and one or more computer-implemented-servers 216. Other implementations of target system 120 may include some of the user devices listed above, or include other devices not listed above.

In an embodiment, target system 120 includes one or more storage devices used to store one or more databases 218. For example, target system 120 may include several storage devices that communicate with each other and are used to host one or more databases 218 containing data and data files to be collected by collector 144.

Once data collection service 130 creates and deploys collector 144, data collection service 130 may send (84) a notification 134 to a user of target system 120 to notify the user that a data collection request has been issued against data owned or managed by the user, and a computer-implemented collector 144 is ready to be downloaded to target system 120 to collect the requested data from target system 120.

A user of target system 120 may be any entity whose electronic data is to be collected, audited, or otherwise requested. For example, a user of target system 120 may be a user of a smart phone 210, on which data to be collected is stored. According to another example, a user of target system 120 may be a user of tablet 212 and one or more servers 216, on which data to be collected is stored. According to other example, a user of target system 120 may be a custodian of one or more devices 210-218 that are hosted by target system 120 and that contain data and data files to be collected by collector 144.

A custodian is the context of the approach for collecting data and data files from target system 120 is a person (or persons) who is responsible for managing and maintaining one or more computer resources in target system 120. For example, a custodian of target system 120 may be an owner of a computer device of target system 120. According to another example, a custodian of target system 120 may be a system administrator of the computer devices included in target system 120. According to other example, a custodian of target system 120 may be a service provider that manages computer resources of target system 120. The term custodian and the term user of target system 120 are used interchangeably herein.

Figure 5:
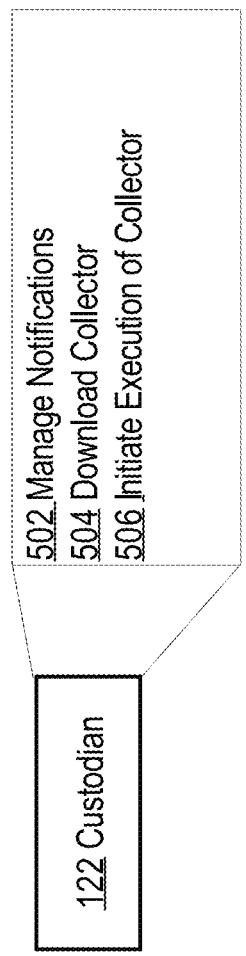
FIG. 5 is a block diagram that depicts examples of tasks performed by a custodian.

FIG. 5 is a block diagram that depicts examples of tasks performed by a custodian. The example tasks depicted in FIG. 5 are to be viewed as non-limiting examples of a variety of tasks to be performed by a custodian.

In the example depicted in FIG. 5, a custodian may be responsible for managing 502 notifications exchanged with target system 120. The notifications may include the notifications that are received by target system 120 as well as the notifications that are sent from target system 120. For example, a custodian may be a contact person to whom notifications about legal discovery are sent. Notifications may include requests for downloading a collector onto computer systems of target system 120, requests for providing credentials for access to the computer systems of target system 120, and the like.

A custodian may also be responsible for downloading 504 a collector onto computer resources of target system 120. For example, upon receiving a notification about a legal discovery request, a custodian may be asked to select an indicated hyperlink to facilitate downloading a collector onto computer resources of target system 120. Other method of downloading a collector may also be implemented.

Once a user (or a custodian) of target system 120 receives notification 134 indicating that collector 144 is ready to be downloaded onto target system 120, the user may initiate the downloading. To accomplish that, a user may for example, select a hyperlink provided in notification 134. By selecting the hyperlink, the user may initiate downloading (88) of collector 144 from network storage services 140 to one or more devices of target storage services 140.

Depending on the implementation of collector 144, downloading of collector 144 may include creating an instance of collector 144 and installing the instance on target system 120. Alternatively, the downloading may include making a copy of collector 144 and transmitting the copy to target system 120.

A custodian may also be responsible for initiating 506 execution of a collector on computer resources of target system 120. For example, a custodian may be provided with instructions for starting a collector once the collector is downloaded onto target system 120.

Once collector 144 is downloaded onto target system 120, collector 144 starts collecting data and data files specified by data collection service and requested by requestor 110.

Access to resources of target system 120 may be facilitated by a user or a custodian of target system 120. For example, a user of target system 120 may be asked to provide access credentials for accessing the user's data stored on devices of target system 120. The user may also be asked to provide credentials of a system administrator for accessing system data stored on devices of target system 120.

Collection of data and data files from target system 120 may include collecting various types of data and files, including data files having specific types and hosted by specific devices or residing in specific directories. For example, the collection may include collecting data and data files that are JPG image files hosted by workstation 214.

In an embodiment, identifying data and data files that have specific types is performed based on unique signatures that are embedded in the data files. Using unique signatures of the files to identify the data files to be collected is more reliable than using file extensions included in the file names because the file extensions may not necessarily correspond to the actual type of the file. Relying on the file signatures enables providing more accurate collection results than if the data collection is performed based on the file extensions.

According to another example, a collection may include collecting all data and files, including hidden files and system administration files that are stored in database 218.

Once collection of all requested data and data files from computer resources of target system 120 is completed, the collected data and files 154 may be transmitted (90) to network storage services 140. Optionally, an electronic email 164 may be sent to data collection service 130 to indicate that the collection has been completed.

In an embodiment, a user of target system 120 requests and receives reports and summaries generated based on data and files that have been collected from target system 120. For example, a user may be able to access a data analysis and reporting tool, and request a customized report for viewing the collected data and files. Examples of the data analysis and report tools and examples of reports that can be generated by the tool are described in FIGS. 13-26.

In an embodiment, a process of collecting data and data files from target system 120 allows preserving the integrity and security of the collected data. Since the data and files are collected from target system 120 independently from users and owners of target system 120, the manner in which the data and files are collected assures a high level of reliability of the data.

F. Collector

In an embodiment, collector 144 is a software application configured to collect electronic data and data files from target system 120. In the context of deployment of collector 144, collector 144 is viewed as an instance or an executable code that can be downloaded, installed and executed on computer resources of target system 120.

Collector 144 may be created and deployed by data collection service 130, as depicted in FIGS. 1-3. Alternatively, collector 144 may be created and deployed by a user of requestor 110, or any other entity requesting a collection of the data and files from target system 120.

FIG. 3 is a block diagram that depicts an example arrangement 100 for data collection system architecture. In addition to the elements described above and depicted in FIGS. 1-2, FIG. 3 depicts example components that may be included in collector 144. The example components of collector 144 depicted in FIG. 3 are to be viewed as non-limiting examples of the components, and have been provided to illustrate some of many types of components that may be implemented in collector 144.

In the example depicted in FIG. 3, collector 144 comprises a collection manager 310, a communications manager 320, and a collection specification data 330. Other implementations of collector 144 may include additional components or components not shown in FIG. 3.

Collection specification data 330 includes data that describes types of data and data files to be collected and data that describes resources of target system 120 from which the data and data files are to be collected. For example, collection specification data 330 may specify that collected information is to include all image files in the JPG format that are hosted by standalone workstations of target system 120.

Identifying the image files that are in the JPG format may be performed using various approaches, including the approach based on using signatures embedded in the files. Using file signatures appears to be more reliable than using file extensions because the file extensions, not file signatures, may be modified by users.

According to another example, collection specification data 330 may specify that collected information is to include all PDF files created after a particular date and hosted by each and every device included in target system 120. The examples provided herein are not to be viewed as limiting the scope of data that may be stored as collection specification data 330.

In an embodiment, collection specification data 330 is generated based on collection definition data provided by users of requestor 110, users of data collection service 130, and the like.

Collection manager 310 is configured to perform a collection of data and data files, specified by collection specification data 330, from resources of target system 120. Collection manager 310 may be implemented as an executable module configured to execute instructions for collecting the specified data and data files from the specified devices and locations on target system 120.

Communications manager 320 is configured to facilitate access to data and data files from resources of target system 120 specified by collection specification data 330. For example, if collection specification data 330 indicates that the collection is to include all system files residing on all servers hosted by target system 120, then communications manager 320 may facilitate access to the system files on all servers of target system 120.

In an embodiment, collector 144 is created by data collection service 130 in response to data collection service 130 receiving a request from a user of requestor 110. The request may provide instructions specifying the types of data and data files to be collected and specifying the computer resources of target system 120 from which the data and files are to be collected. As data collection service 130 generates collector 144, data collection service 130 may also store the specification of the data types and the computer resources to be searched in collection specification data 330 of collector 144. Specification of the data types to be searched and the data computer resources to be searched may be based on the collection definition data described above.

Once collector 144 is created and transmitted (86) to network storage services 140, collector 144 is stored in network storage services 140. Data collection service 130 may also notify a user of target system 120 that collector 144 has been deployed and is ready to be downloaded to target system 120.

In an embodiment, collector 144 may be downloaded (88) when a user of target selects a link, such as a hyperlink, provided to the user in notification 134. Once the download is completed, execution of collector 144 may start.

Figure 6:
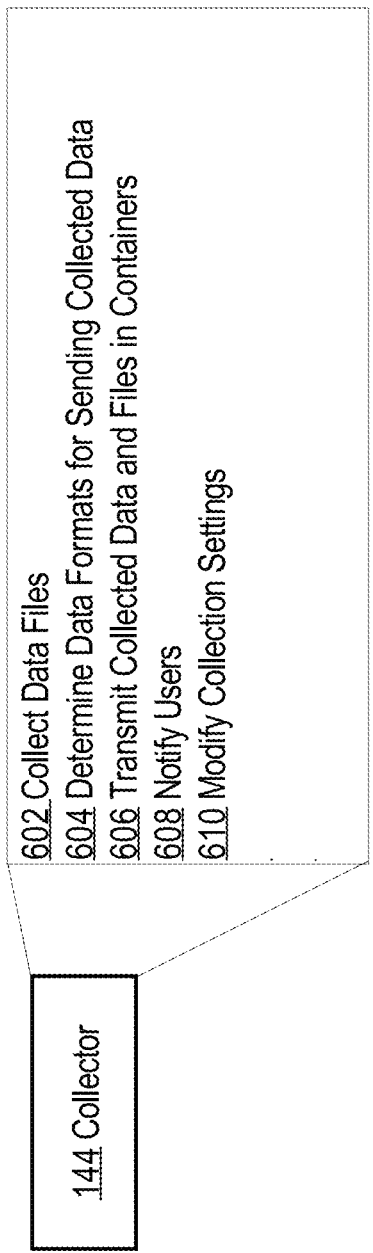
FIG. 6 is a block diagram that depicts examples of collector services.

FIG. 6 is a block diagram that depicts examples of collector services. The depicted examples of services provided by collector 144 are to be viewed as non-limited examples of various services. For example, collector 144 may be configured to collect 602 data and data files from computer resources of target system 120, determine 604 data formats and media for sending the collected data and data files, and transmit 606 the collected data and data files in logical containers compatible with the determined data formats.

Collector 144 may also be configured to send 608 notifications to users. Notification may include notifications to a custodian of target system 120, notifications to a user of data collection service 130, and/or notifications to a user of requestor system 110.

In an embodiment, as collector 144 is executed on target system 120, collector 144 collects from target system 120 data and data files that are specified by collection specification data 330, and stores the collected data and data files at network storage services 140. The process of collecting data and data files from target system 120 allows preserving the integrity and security of the collected data because the data and files are collected from target system 120 independently from users and owners of target system 120.

Storing of the collected data and data files may involve determining a format that is the best suited for transmitting and storing the collected data and data files in network storage services 140. Selecting a format that is suitable may be viewed as determining a "container" in which the collected data and data files may be exported for storing. For example, a container may be data files represented in a data format that is known to user devices of requestor 110 and data collection service 130.

A container may be selected based on a variety factors, including, without limitation, the size to the collected data and data files, available bandwidth of network connections between target system 120 and network storage services 140.

Once collection of data and data files from target system 120 is completed, collector 144 (or target system 120) may generate an electronic communication 164 and cause sending (94) electronic communication 164 to data collection service. Sending email 164 is optional. Email 164 may include an indication that the data and/or data files have been collected and stored in in network storage services 140, such as a cloud service, a server managed by a service provider, and the like. Although depicted in the figures and described herein in the context of an email for purposes of explanation, the electronic communication 164 from collector 144 may be in any form that may vary depending upon a particular implementation.

In an embodiment, a user of network storage services 140 and/or users of data collection service 130 may be able to request and receive a report of data and files that have been collected from target system 120. For example, a user may be able to access a data analysis and reporting tool, and request a customized report for viewing the collected data and files. An example of the data analysis and report tool and examples of reports that can be generated by the tool are described in FIGS. 13-26.

G. Network Storage Services

In an embodiment, network storage services 140 is a computer-based system configured to store electronic data. Network storage services 140 may be implemented in one or more computing devices configured to store data and data files on one or more servers. For example, network storage services 140 may be implemented in devices such as magnetic disks, optical disks, and the like.

Network storage services 140 may be implemented in any type of server and may be managed by any type of entity. For example, network storage services 140 may be a cloud service.

Network storage services 140 may be configured to store information received from requestor 110, data collection service 130 and target system 120, and to make the stored information available to any of the above elements.

III. File Signatures

In an embodiment, data and data files are identified as being stored in a particular format based on a file signature embedded in the data file, rather than merely based on a file extension associated with the data file name.

A file format is a standard way that information is encoded for storage in a computer file. It specifies how bits of the data are used to encode information in a digital storage medium. File formats may be either proprietary or free, and may be either unpublished or open.

One popular method used by many operating systems is to determine the format of a data file based on the file name extension. A file name extension is usually included in the file name and represented by the letters following the final period in the name. For example, HTML documents are identified by names that end with *.html (or *.htm), and GIF images by *.gif.

One problem with using file extensions for identifying the formal of data files is that relying on the extensions may not be dependable. A user may rename a data file by manually changing the extension of the file. For example, a data file that was named for example as filename.html may be renamed to filename.txt, and thus become unrecognizable as an HTML file.

In an embodiment, data files are recognized based on information that specifies the file type format and that is stored inside the file itself, and not merely based on a file extension included in the name of the data file. Such information may include data, such as binary strings or other information, embedded in the content of the data files. The data specifying the file type format are usually embedded in specific locations in files. The data are also referred to as the data file format metadata or a signature of the data file. The data may be represented in ASCII format, hexadecimal format, or any other format.

FIG. 9 depicts a table that contains examples of signature data. The depicted examples are to be viewed as non-limiting examples of signatures of data files. Column 910 of the table lists different types of data file formats. Column 920 of the table provides hexadecimal representations of the signatures for the data file formats listed in column 910. Column 930 of the table provides the ISO 8859-1 representations of the signatures for the data file formats listed in column 910. Non-limiting examples of some of the signatures embedded in actual data files are depicted in FIG. 10-12.

Figure 10:
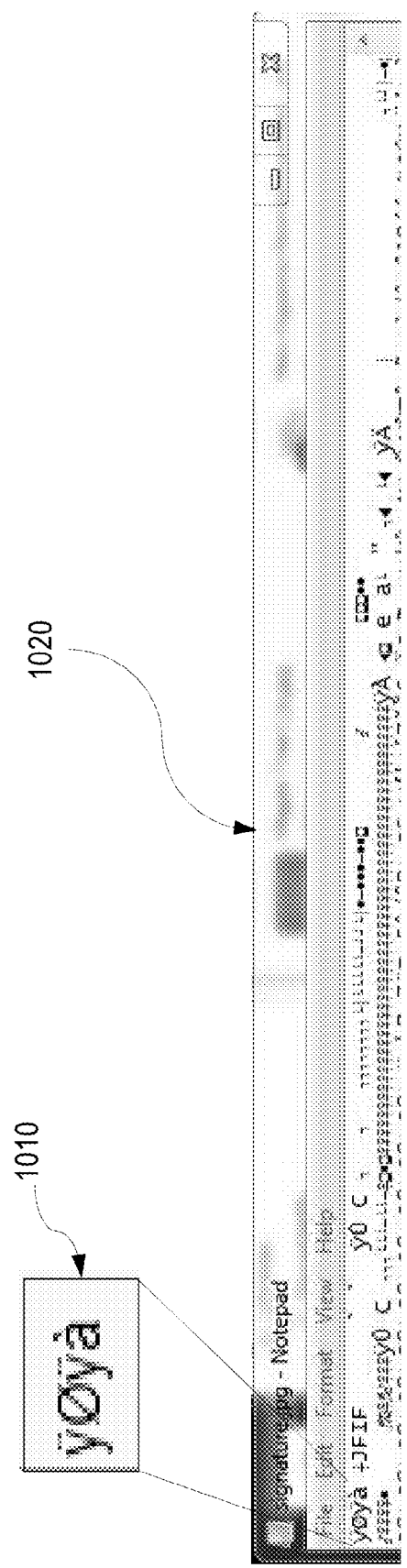
FIG. 10 is a snapshot of a file in the jpeg format that contains a file signature.

FIG. 10 is a snapshot of a file 1020 in the JPG format that contains a file signature 1010. As depicted in FIG. 10, signature 1010 is represented in file 1020 in ISO 8859-1 format as "ÿØÿà" and appears at the beginning of the data file. Other representations of signature 1010 may also be implemented.

Figure 11:
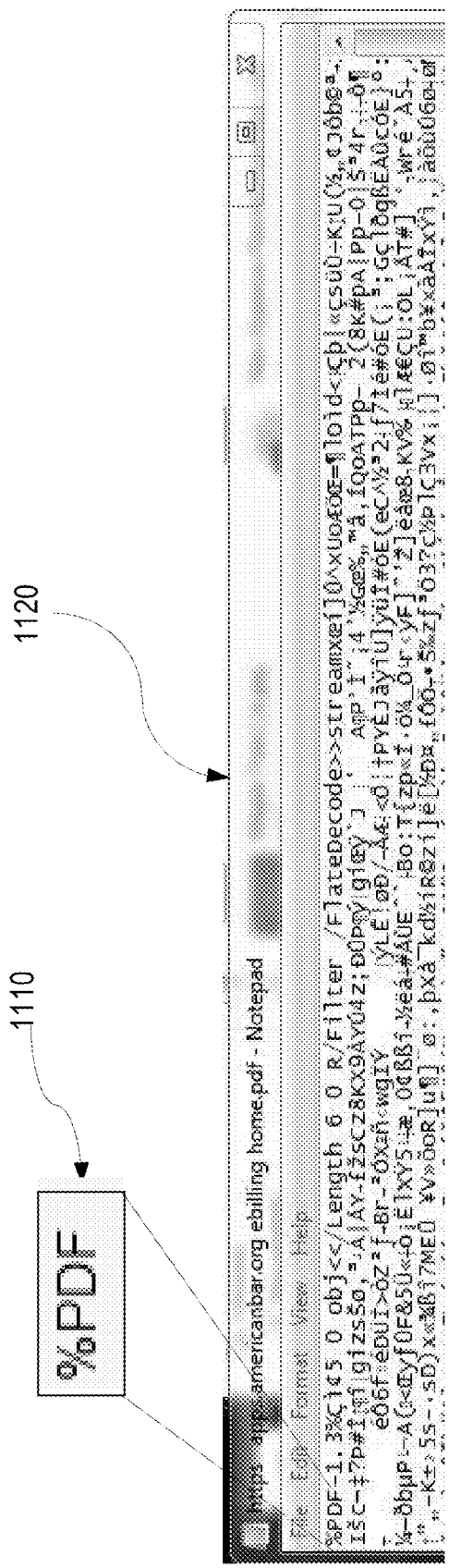
FIG. 11 is a snapshot of a file in the pdf format that contains a file signature.

FIG. 11 is a snapshot of a file 1120 in the PDF format that contains a file signature 1110. As depicted in FIG. 11, signature 1110 is represented in file 1120 in ISO 8859-1 format as "%PDF," and appears at the beginning of the data file. Other representations of signature 1110 may also be implemented.

Figure 12:
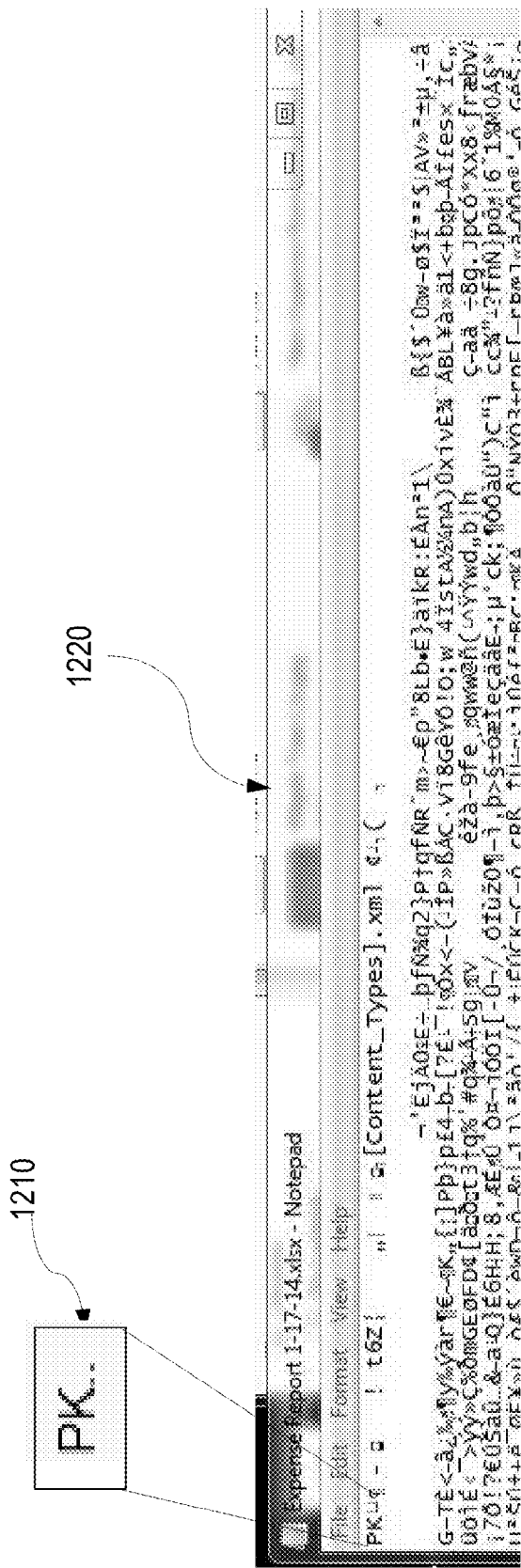
FIG. 12 is a snapshot of a file in the xls format that contains a file signature.

FIG. 12 is a snapshot of a file 1220 in the XLS format that contains a file signature 1210. As depicted in FIG. 12, signature 1210 is represented in file 1220 in ISO 8859-1 format as "PK . . . ," and appears at the beginning of the data file. Other representations of signature 1210 may also be implemented.

Using file signatures embedded in data files to identify data files for the purpose of performing legal discovery is preferable because it allows recognizing the data files that are in a particular format, even if some of the files have extensions other than those indicating the particular format. The approach for legal discovery allows searching and identifying the data files that are in the particular format based on data, such as signatures, embedded in the data files themselves, not merely based on file extensions that may be easily modified.

IV. Example Workflow for Collecting Data and Data Files

Figure 7:
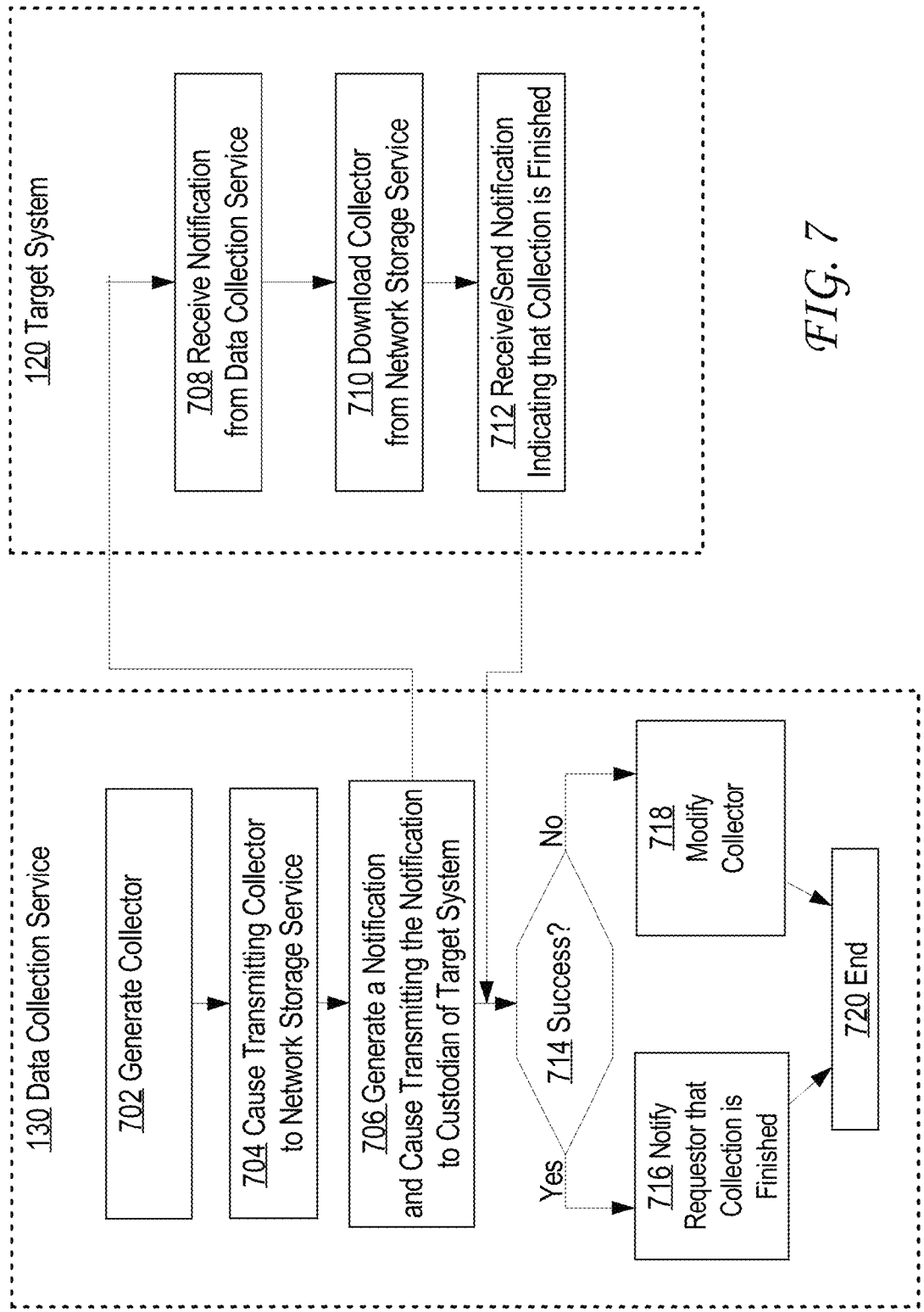
FIG. 7 is a flow diagram that depicts an example approach for collecting data and data files from a target system using a collector.

In an embodiment, a process of requesting, collecting and storing data and data files for the purpose of legal discovery is performed by one or more entities that communicate with each other and exchange information among each other. A request for performing the legal discovery on target system 120 may be created by a user of requestor 110 and communicated to data collection service 130. Based on the received data, data collection service 130 may generate a collector, and deploy the collector to target system 120. The collector may collect the requested data and data files, and cause transmitting the collected data and data files to network storage services 140. Examples of workflows for requesting, collecting and storing data and data files for the purpose of legal discovery are depicted in FIGS. 7-8.

Figure 8:
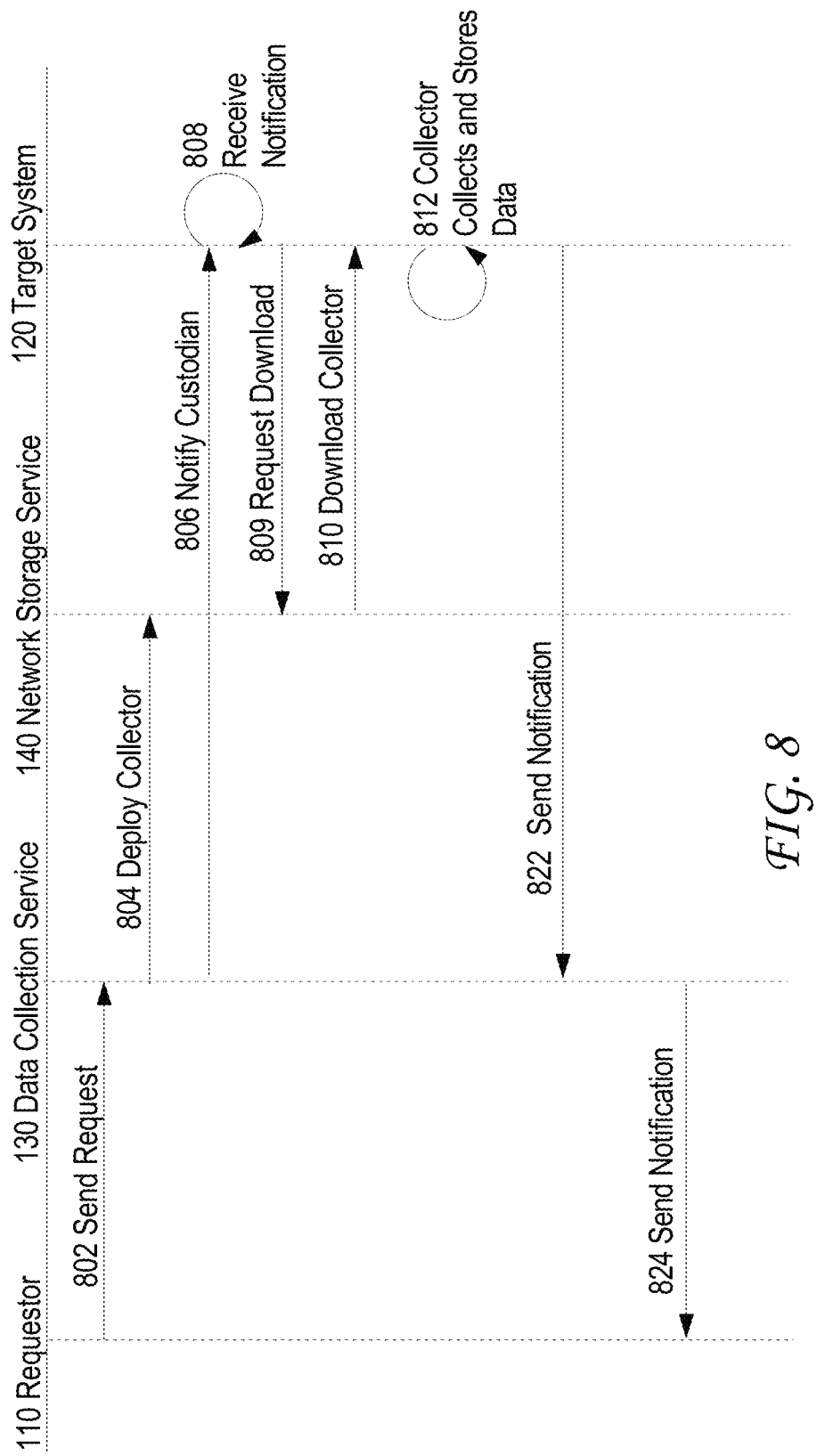
FIG. 8 is a massage ladder that depicts an example approach for collecting data and data files from a target system using a collector.

FIG. 8 is a massage ladder that depicts an example approach for collecting data and data files from a target system 120 using a collector. According to the depicted example, a user of requestor 110 generates a request to collect and storing certain data and data files for the purpose of legal discovery. The user may specify the type of data and data files to be collected, the time periods for which the data and data files are to be collected, computer resources of target system 120 from which the data and data files are to be collected, and the like. The user-provided specification is also referred to as collection definition data. The collection definition data may be stored in network storage services 140, or included in a request generated by requestor 110.

In an embodiment, data files types may be specified by providing digital signatures of the data files. Examples of various signatures are described in FIGS. 9-12.

In step 802 of FIG. 8, a user of requestor 110 sends a request to data collection service 130. The request may include collection definition data containing the details of the request. Alternatively, the request may include one or more hyperlinks pointing to locations at network storage services 140 on which the collection definition data has been stored.

Upon receiving a request from requestor 110, data collection service 130 may analyze the request, and use the information included in the request to generate a collector. Various tasks involved in generating a collector are described FIG. 7.

FIG. 7 is a flow diagram that depicts an example approach for collecting data and data files from a target system 120 using a collector. In step 702, data collection service 130 generates a collector. Using information included in a request received from requestor 110, data collection service 130 may generate collection definition data.

Collection definition data may include information about file types of data files to be searched, sources to be searched, indications of whether, or which, attachments are to be searched, and indications whether legal forms, such as court orders and other legal documents, are to be included in legal discovery. Collection definition data may also include information about storage types that are to be searched, and storage locations that are to be searched. Furthermore, collection definition data may include user credentials, group credentials 416 and other authentication information to be used by a collector to perform legal discovery. In some implementations, some or all of the above information may be already stored in the collection definition data. For example, some of the information may be already provided and stored by a user of requestor 110.

Collection definition data may further include time constrains for performing legal discovery, types of processing, types of modifications (if any), methods of communicating results of legal discovery, email addresses to be used by a collector and/or a custodian, types of notifications, error handling procedures, and the like. Collection definition data may also include a hyperlink to a cloud data storage from which a collector may be downloaded onto target system 120. Other types of information not described above may also be included in the collection definition data.

In step 704, data collection service 130 causes transmitting a collector to network storage services 140. Transmitting a collector to network storage services 140 is also depicted in FIG. 8, in which, in step 804, a collector is deployed to network storage services 140.

Referring again to FIG. 7, in step 706, data collection service 130 generates a notification and causes transmitting the notification to a custodian of target system 120. This is also depicted in FIG. 8, in which, in step 806, data collection service 130 notifies a custodian of target system 120.

A notification to a custodian may be transmitted as an electronic mail to notify a user of target system 120 that target system is for example, in a litigation hold. The electronic mail may also indicate that a court order has been issued to collect data and data files form target system 120. For example, the email may include a copy of the court order.

In an embodiment, an electronic mail sent to a custodian pf a target system 120 includes instructions for accessing and downloading a collector from network storage services 140 onto target system 120 to start execution of the collector on target system 120. Furthermore, the email may include an identification of the location at which the collector has been stored in network storage services 140, and other types of information.

In step 708, target system 120 receives a notification, such as an electronic mail, from data collection service 130. This is also depicted in FIG. 8, in which, in step 808, target system 120 receives a notification from data collection service 130.

Alternatively, target system 120 may receive a notification about the legal discovery directly from requestor 110. For example, a user of requestor 110 may contact a custodian of target system 120 directly by sending an electronic message to the custodian and providing information about accessing, downloading and executing a collector. This embodiment is not depicted in FIGS. 7-8.

In step 809 of FIG. 8, upon receiving a notification, a custodian (or a user) of target system 120 may review the notification and proceed to accepting the instructions for downloading a collector onto one or more computer resources of target system 120. For example, a notification may include a hyperlink and instructions indicating that upon selecting the hyperlink, a collector will be downloaded onto target system 120.

In step 810 of FIG. 8 (also in step 710 of FIG. 7), a custodian of target system 120 causes downloading a collector from network storage services 140 onto computer resources of target system 120. Various methods of downloading a collector onto target system 120 are described above.

In step 812, a collector collects data and data files from computer resources of target system 120. The data and data files to be collected and the specification of the resources to be searched may be specified in collection definition data that is accessible to the collector from network storage services 140, or from other storage devices. Various tasks performed by a collector are described in FIG. 6.

Once collection of the requested data and data files has been completed, a collector may store the collected data and data files in network storage services 140. For example the collected data and data files may be stored in a cloud service managed by network storage services 140, or may be stored in any storage device managed by network storage services 140. Alternatively, the collected data and data files may be transmitted to requestor 110, and/or data collection service 130.

Upon completing a data collection from computer resources of target system 120, a collector may generate notifications to the interested parties. For example, a collector may generate a notification to a custodian of target system 120, to notify the custodian that the collection of the requested data and data files has been completed and that the requested data and data files have been stored in network storage services 140.

In step 712 of FIG. 7, a custodian of target system 120 receives a notification indicating that a collection of the requested data and data files has been completed and that the requested data and data files have been stored in network storage services 140. Upon receiving such a notification, the custodian of target system 120 may generate and send to data collection service 130 a notification that indicates a completion of the collection to data collection service 130. Alternatively, the custodian may forward the received notification to data collection service 130.

Additionally, or alternatively, a collector may generate a notification to a user of requestor 110 to inform the user that the collection of the requested data and data files has been completed. A collector may also generate a notification to data collection service 130 to indicate that the collection of the requested data and data files has been completed.

In step 714 of FIG. 7, data collection service 130 receives a notification from a collector indicating that requested data and data files have been stored in network storage services 140. Data collection service 130 also determines whether the collection was successful. For example, data collection service 130 may access the stored data and data files and verify whether the stored information indeed includes the requested data and data files. Furthermore, data collection service 130 may verify whether any error massages have been included or received from a collector.

If a collection of the requested data and data files was successful, then in step 716 of FIG. 7 (and in step 824 of FIG. 8), data collection service 130 notifies requestor 110 that a collection of the requested data and data files was successful and that the requested data and data files have been successful stored in network storage services 140. The notification may also include an indication of the location of the stored data and data files and instructions for accessing the stored information.

However, if a collection of the requested data and data files was not completely successful, then, in step 718, data collection service 130 may attempt to determine solutions for the problems. For example, data collection service 130 may review the manner in which a collector was generated and deployed, and if possible, modify the collector. According to another example, data collection service 130 may send messages to a custodian of target system 120 to request additional information about the collection process and to request error logs generated by a collector. Furthermore, data collection service 130 may review collection definition data, and if possible modify the collection definition data and redeploy a collector.

The process of requesting, collection and storing data and data files from target system 120 ends in step 720. The process may be repeated each time a request for legal discovery is issued or modified by requestor 110. Furthermore, the process may be repeated each time a collector is modified and redeployed. Moreover, the process may be repeated each time collection definition data is modified and provided to a collector.

V. Exporting Collected Data and Data Files

In an embodiment, collected data and data files may be exported to network storage services 140 in a variety of formats. Non-limiting examples of the formats in which the collected data and data files may be exported is the comma-separated values (CSV) format.

The comma-separated values (CSV) format is a widely used text file format for exchanging data between computer devices and applications. The CSV format may be implemented in a variety of ways, but usually it specifies that data records are to be concatenated and each field of the data records be delimited using a comma. CSV allows exporting tabular data between programs that natively operate on incompatible formats. CSV is widely supported by a variety of computer systems and devices.

In an embodiment, a collector collects the requested data and data files and exports the collected data and data files in the CSV format. Exporting the collected data and data files in the CSV format may include creating a data file in the CSV format. The CSV data file needs to be large enough to accommodate data of the collected data and data files. The CSV data file may contain data records in which the collected data and data files are stored in such a way that the individual records of the CSV file are separate using commas.

In an embodiment, a CSV file is transmitted to network storage services 140. Upon receiving the CSV data file, network storage services 140 parses the CSV file, and stores the data records of the CSV file in data structures that are native to network storage services 140 and that are accessible to users of requestor 110.

Other method of exporting the collected data and datawork storage services 140 may also be implemented.

VI. Data Analysis and Reporting Tool

Data analysis and reporting tool is a computer implemented application configured to facilitate generating requests for data collection from target system 120, performing the collection, and reviewing the collected data and data files. Data analysis and report tool may be implemented as a software application hosted by a standalone system, or as a software application facilitating access to shared and distributed resources hosted by a plurality of computer systems.

A. Functionalities of a Data Analysis and Reporting Tool

In an embodiment, a data analysis and reporting tool is available to one or more entities involved in requesting, collecting and providing data and data files from target system 120. In some implementations, the same data analysis and reporting tool may be used by users of requestor system 110, users of data collection service 130, users of target system 120, or optionally by users of network storage services 140. If some of the capabilities of the data analysis and reporting tool are restricted to some users, then the tool may be designed to customize the capabilities of the tool based on credentials or authorization of the specific users. In some other implementations, a data analysis and reporting tool is customized to specific needs of the users, and different versions of the tool or even different tools may be deployed for users of requestor system 110, users of data collection service 130, users of target system 120, and users of network storage services 140.

In an embodiment, a data analysis and reporting tool may be used by a user of requestor system 110 to specify a request for collecting data and data files from target system 120. A user of requestor system 110 may access the data analysis reporting tool to specify the type of data and/or data files that the user would like to have collected from target system 120. The user may also use the tool to specify the resources, file directories and the like of the target system 120 from which the requested data is to be collected.

The same, or another, data analysis and reporting tool may be used by a user of data collection service 130 to view the request received from requestor system 110, to create and deploy collector 144 for performing the collection, and to view the collected data and files once the collection is completed. For example, a user of data collection service 130 may access the data analysis reporting tool to receive the request from requestor 110, review the request to identify a specification of the data and files to be collected, create collector 144, and deploy collector 144. User of data collection service 130 may also access the data analysis and reporting tool to review the data and files collected from target system 120 and to generate reports based on the collected data and files.

Optionally, the same or another, data analysis and reporting tool may also be available to a user of target system 120 to view a request for collecting data and files from target system 120, and to view the collected data and files. User of target system 120 could also use the tool to generate reports based on the collected data and files.

In an embodiment, a data analysis and reporting tool may be implemented as a Web application that may be hosted by a computer server and accessible to users via hyperlink, which when selected allows downloading Web pages onto a user's device. A Web application may include a Web interface 114 and a control manager for providing access to data and data files stored in target system 120. Web interface provides a Web-based interface, for example one or more Web pages, that can be accessed by a user of requestor system 110 via a Web browser. The Web-based interface allows a user to specify the types of data and files to be collected from target system 120, the resources of target system 120 to be searched for the requested data and files, the types of reports requested by requestor 110, and the like.

In an embodiment, a Web application implementing a data analysis and reporting tool may be hosted on any type of a server accessible to the users of the tool.

In an embodiment, a data analysis and reporting tool is configured to generate a request for collecting data and files from target system 120. A request may be stored externally to the data analysis and reporting tool, and accessible to the users via one or more communications links configured in a communications network. A request is described in detail in FIG. 1.

In an embodiment, a data analysis and reporting tool is configured to specify the types of data and files to be collected from target system 120 and to specify the resources of target system 120 that are to be searched for the specified data and files. Various ways of specifying the data and data files to be collected and the resources of target system 120 from which the data and files are to be collected are described in detail in FIG. 2.

In an embodiment, a data analysis and reporting tool is configured to generate collector 144 configured to collect data and files from target system 120. A collector is described in detail in FIG. 3.

In an embodiment, a data analysis and reporting tool is configured to access data media storing data and to perform the data analysis on the data stored in the data media. For example, a user of requestor system 110 may provide a digital media, such as a computer disk, a compact computer disk, a memory storage device, and the like, and request that certain data and data files be collected from the media. To facilitate the collection, it is recommended that the media be write-protected, so the content of the media may be protected from accidental overwriting or deleting.

B. Example Workflow

Figure 13:
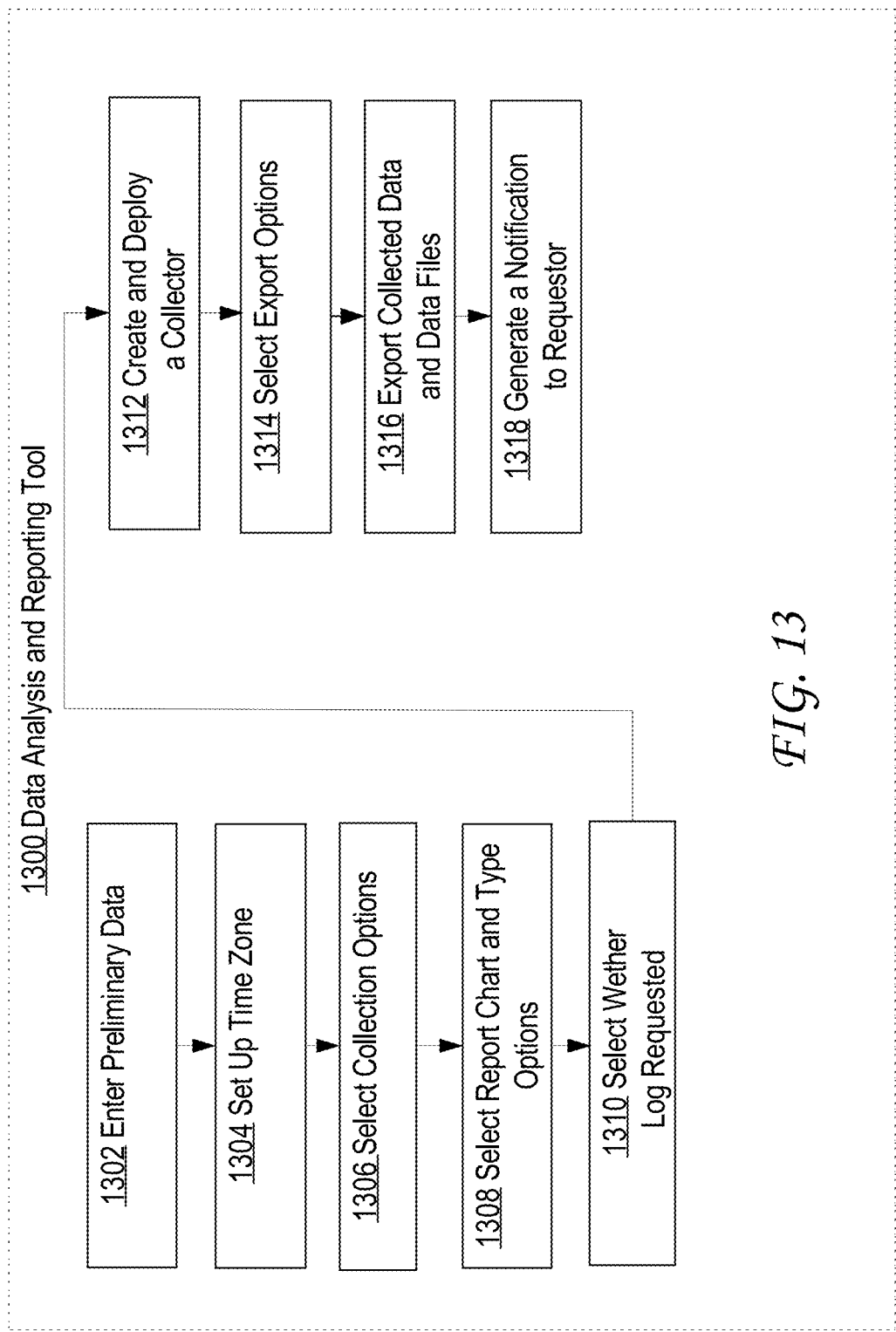
FIG. 13 is a flow diagram that depicts an example approach for data analysis and reporting.

FIG. 13 is a flow diagram that depicts an example approach for data analysis and reporting. The example approach depicted in FIG. 13 is to be viewed as one of many implementations of a data analysis and reporting tool.

In step 1302, a user is prompted to enter preliminary data. The preliminary data may include a name of the user, a name of the project that the user is working on, a name of the organization or a party for whom the user requests collection of data and data files from target system 120. Additionally, or alternatively, a user may be prompted to provide a name of the matter, specify the matter title, and provide other information related to the projection. For example, a user may be asked to define or modify a configuration for collecting the data, or edit a report configuration that may be shown to the user in a pull-out menu.

If a user is providing an electronic media from which certain data and files are to be collected, then the user may be asked to verify whether the media is write-protected.

In step 1304, a user is asked to enter additional preliminary information, such as a time zone in which the user is located. The information about the time zone may be used to time stamp the communications sent by a data analysis and report tool, and the data received by the tool. For example, one time stamp may be included in a request that a user created to specify the data and data files to be collected, another time stamp may be included in a collector deployed to network storage services 140, other time stamp may be included in a report generated based on the contents of the collected data and data files.

In an embodiment, if providing a time zone is not required, or a user fails to provide the time zone information, a data analysis and reporting tool assigns a default information about the time zone or determines the time zone for the user. For example, a user may select an option labelled as "coordinated universal time," and the tool will determine the time zone for the user.

In step 1306, a user is asked to enter data collection options. Data collection options may include a variety of options that are selectable by the user. For example, a user may be prompted to select one or more types of file categories that the user wishes to have collected from target system 120. Non-limiting examples of different types of file categories are provided in FIG. 14-15.

Figure 14:
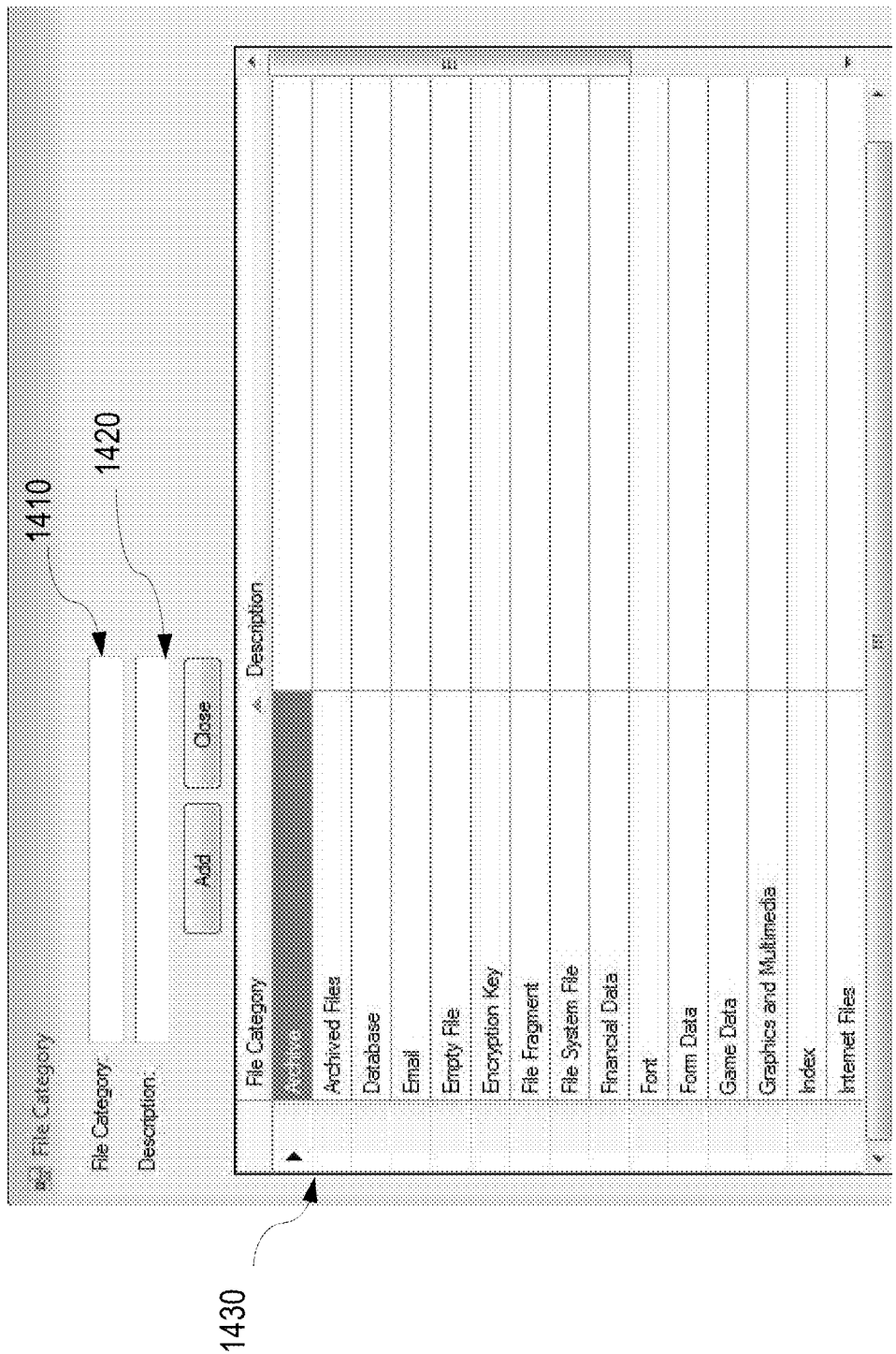
FIG. 14 depicts an example user interface generated by a data analysis and reporting tool that provides an administrator portal that for specifying file categories.

FIG. 14 depicts an example user interface generated by a data analysis and reporting tool that provides an administrator portal that for specifying file categories 1430. The depicted examples are to be viewed as non-limiting examples of the file categories that a user may select when requesting a collection of data and data files.

The depicted example shows that a user may select one or more of the following file categories: active files, archived files, database files, emails, empty files, encrypted files, file fragments, system files, financial data, files containing a particular font, form data, game data, graphics and multimedia data, indexes, Internet files, and the like. Additional file categories are described in FIG. 15

Upon selecting a particular category from list 1430, the selected category may appear in a text box 1410. A selected category is to be included in a request for collecting data and data files from target system 120.

Optionally, a user may add additional description to the selected category by entering the additional description into a text box 1420.

Figure 15:
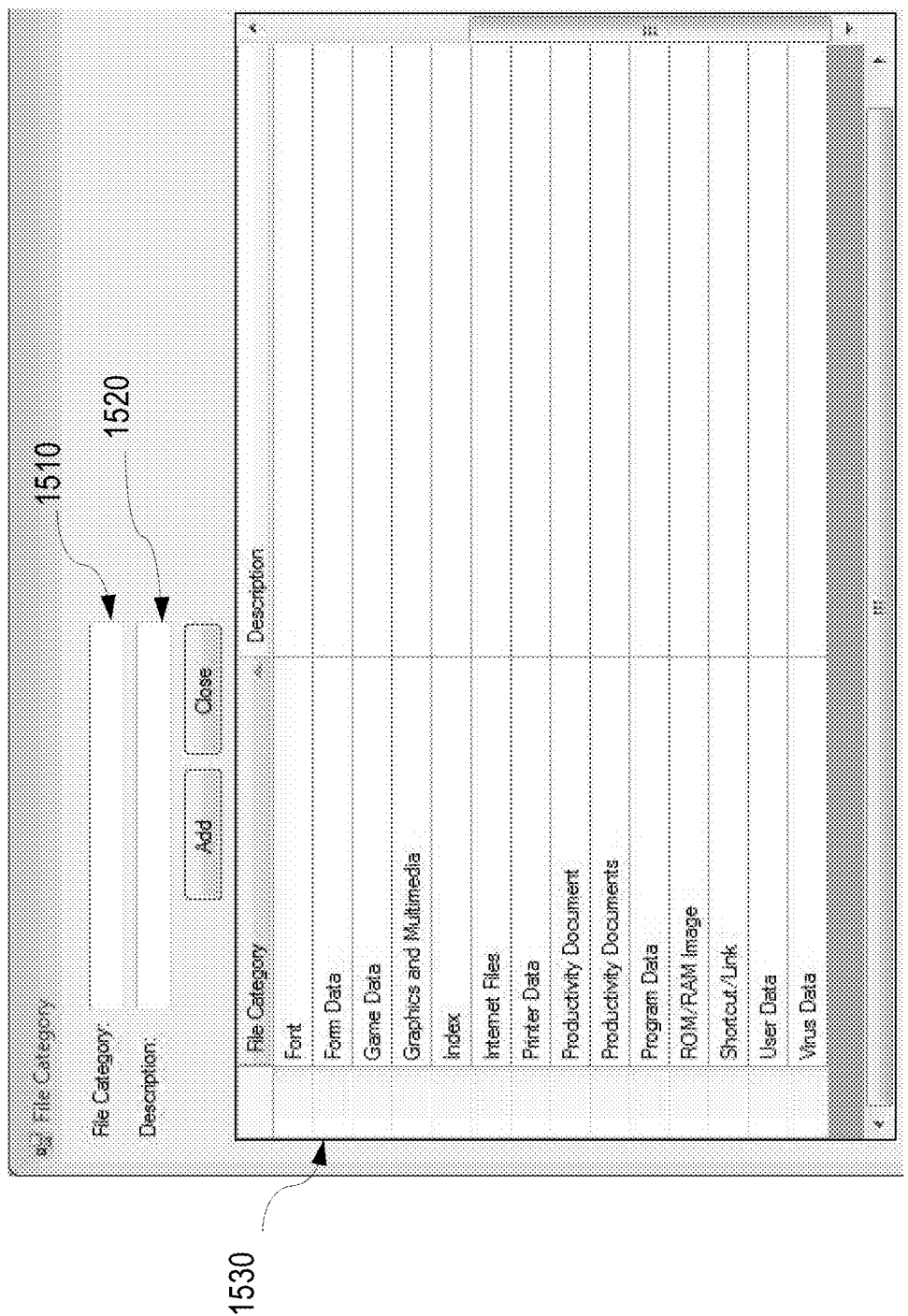
FIG. 15 depicts an example user interface generated by a data analysis and reporting tool that provides an administrator portal that for specifying file categories.

FIG. 15 depicts an example user interface generated by a data analysis and reporting tool that provides an administrator portal that for specifying file categories 1530. The depicted example shows that a user may also select one or more of the following files categories: files containing a particular font, form data, game data, graphics and multimedia data, indexes, Internet files, printer data, a productivity document, productivity documents, program data, ROM/RAM image data, shortcut/links, user data, virus data, and the like.

Upon selecting a particular category from list 1530, the selected category may appear in a text box 1510. A selected category is to be included in a request for collecting data and data files from target system 120.

Optionally, a user may add additional description to the selected category by entering the additional description into a text box 1520. For example, if a selected file category is "productivity document," then a user may type into text box 1520 a name of the document that is to be included in the collection.

Data collection options available to a user may also allow a user to select the data and data files to be collected based on the file extensions. Various types of ways to select files extensions are provided in FIG. 16.

Figure 16:
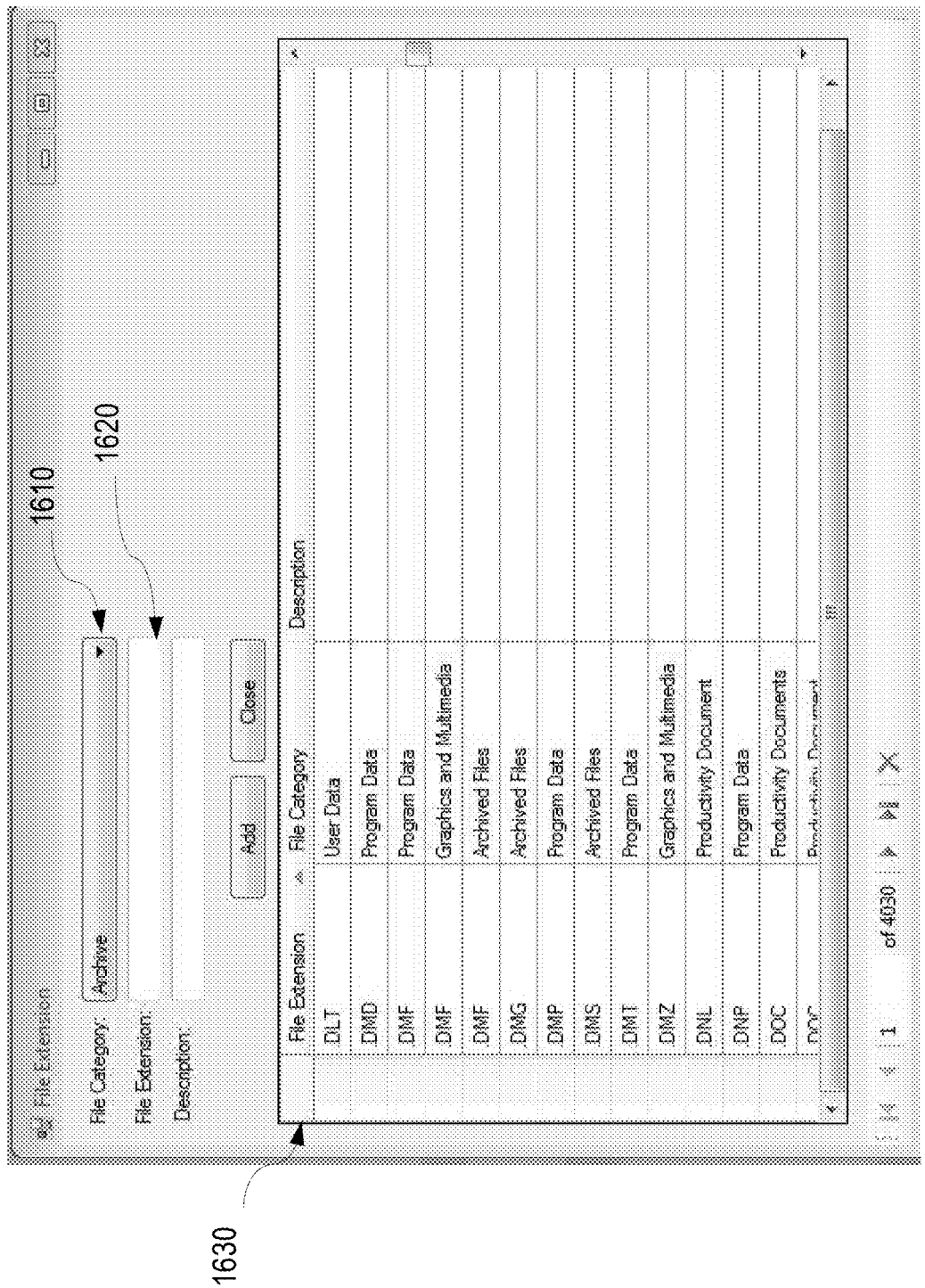
FIG. 16 depicts an example user interface generated by a data analysis and reporting tool that provides an administrator portal that for specifying file extensions.

FIG. 16 depicts an example user interface generated by a data analysis and reporting tool that provides an administrator portal that for specifying file extensions 1630. The depicted example shows that a user may select one or more of the following file extensions: *.DLT, *.DMD, *.DMF, *.DMG, *.DMP, and the like. The extensions depicted in FIG. 16 are not to be viewed as a limited list of possible extensions available to a user.

Upon selecting a particular file extension from list 1630, the selected extension may appear in a text box 1610. A selected extension is to be included in a request for collecting data and data files from target system 120.

Optionally, a user may add additional description to the selected extension by entering the additional description into a text box 1620.

Referring again to step 1306 of FIG. 13, a user may also select one or more system drives (or devices) hosted on target system 120 from which a collection of data and data files is requested. Non-limiting examples of selecting different drives are depicted in FIG. 17.

Figure 17:
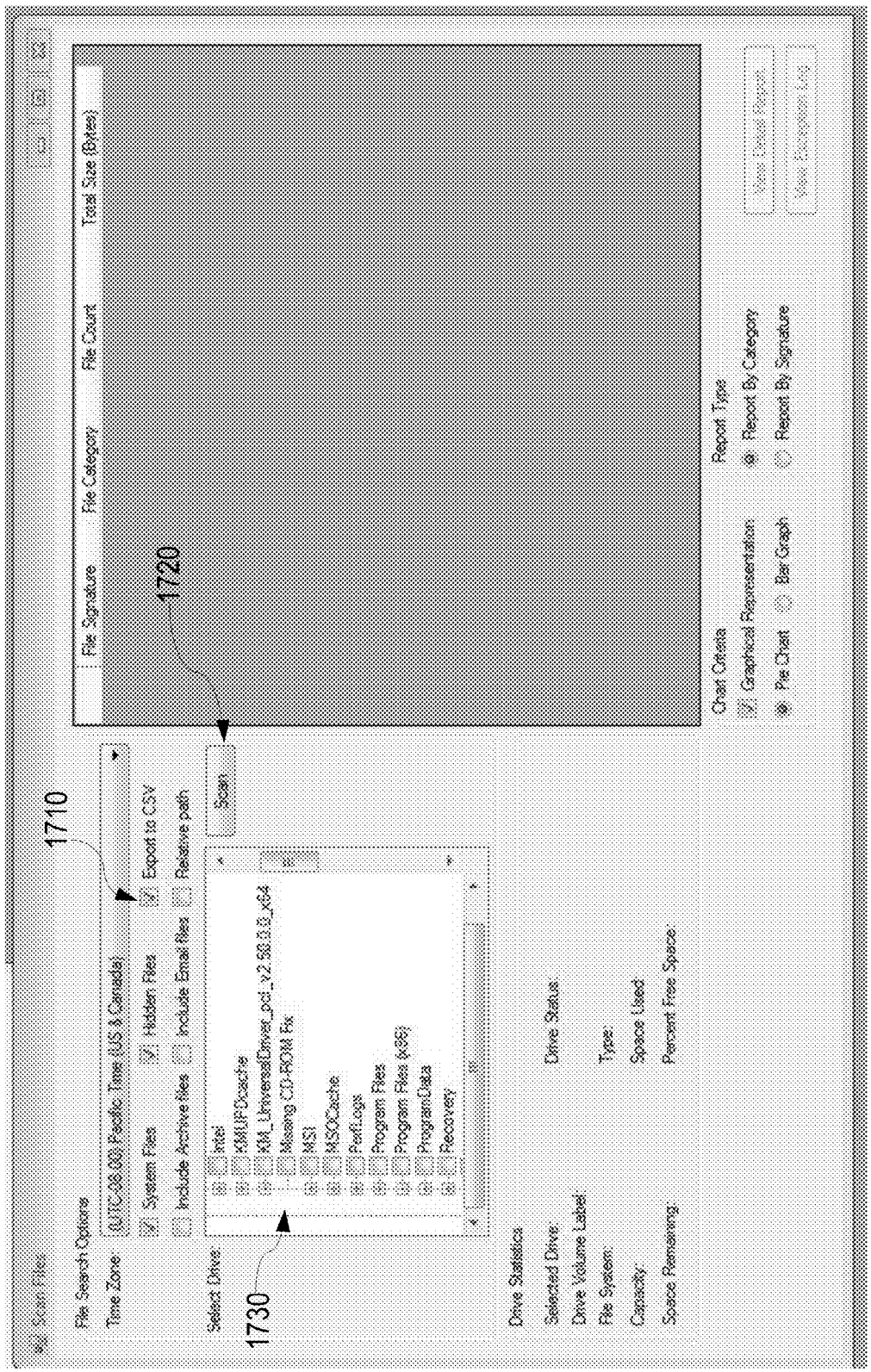
FIG. 17 depicts an example user interface generated by a data analysis and reporting tool that provides an administrator portal that for specifying computer drives to be searched.

FIG. 17 depicts an example user interface generated by a data analysis and reporting tool that provides an administrator portal that for specifying computer drives 1730 to be searched. The example user interface allows a user to select paths in computer drives that are to be searched for specified data and data files. The depicted drives and paths shows paths and drives that were available in a testing environment, and are to be viewed as merely to illustrate the manner in which the paths and drives may be displayed in the interface and selected by the user. For example, if a user selects a particular path or drive from the list 1730, and then selects a button 1720 labelled with a word "scan," then the information about the selected path or drive is saved and used by a collector to collect the certain data and data files. Furthermore, if a user selects a button "export to CSV" 1710, the data analysis are reporting tool will scan the selected computer resources and output information about the collected data and data files to a CSV file. Additional examples are depicted in FIG. 18.

Figure 18:
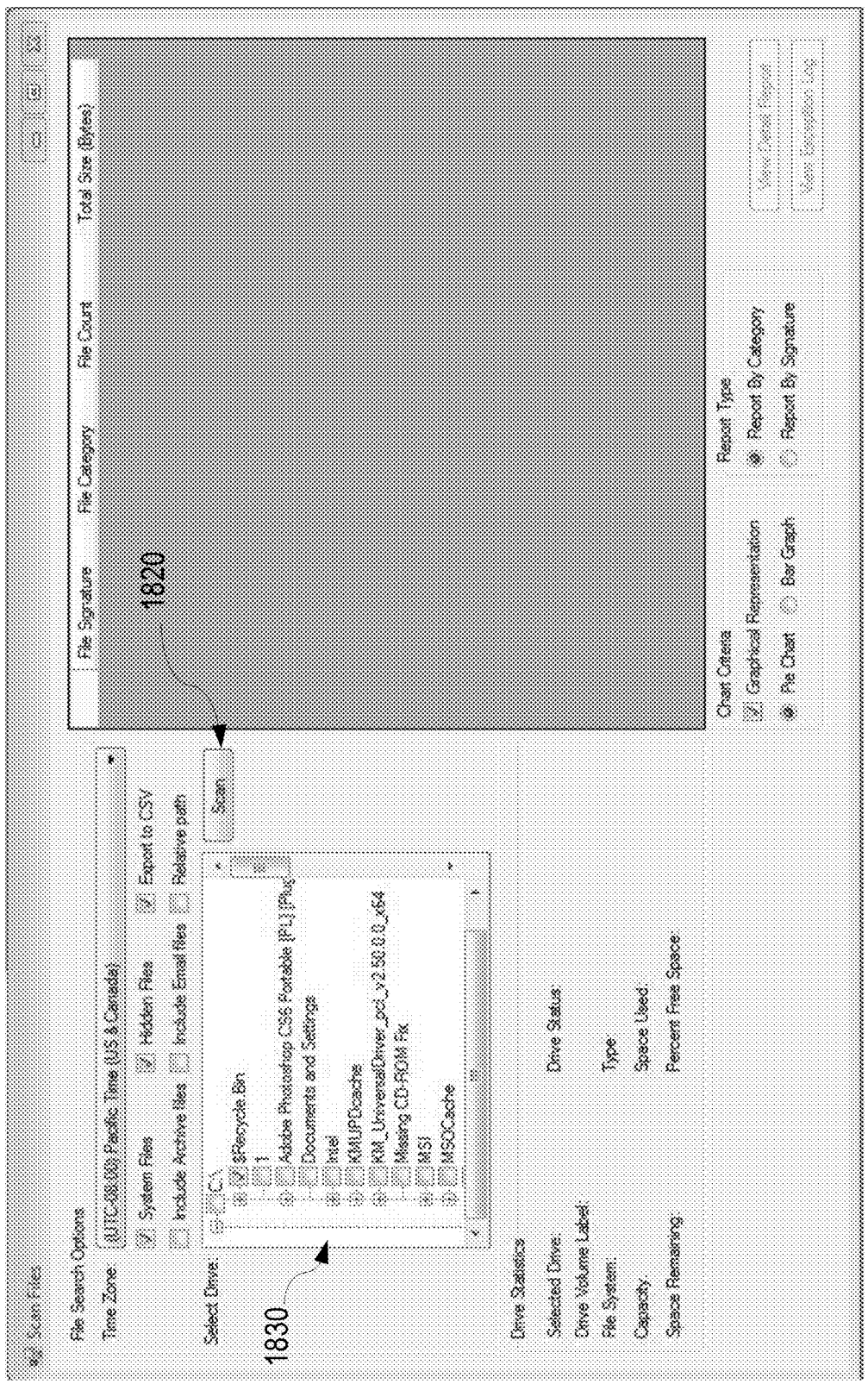
FIG. 18 depicts an example user interface generated by a data analysis and reporting tool that provides an administrator portal that for specifying computer drives to be searched.

FIG. 18 depicts an example user interface generated by a data analysis and reporting tool that provides an administrator portal that for specifying computer drives 1830 to be searched. The example user interface allows a user to select paths in computer drives that are to be searched for specified data and data files. The depicted drives and paths shows paths and drives that were available in a testing environment, and are to be viewed as merely to illustrate the manner in which the paths and drives may be displayed in the interface and selected by the user. For example, if a user selects a particular path or drive from the list 1830, and then selects a button 1820 labelled with a word "scan," then the information about the selected path or drive is saved and used by a collector to collect the certain data and data files.

Figure 19:
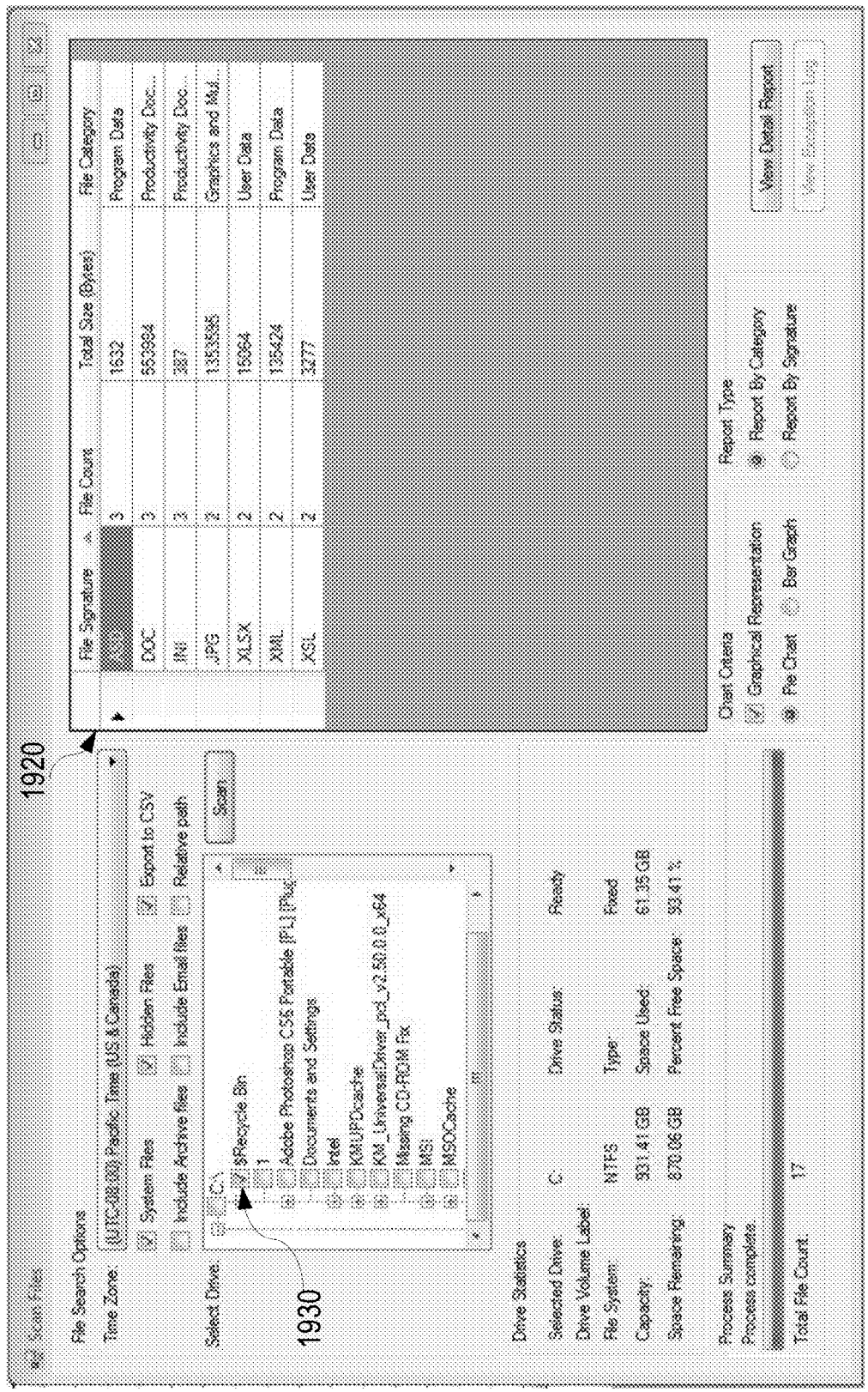
FIG. 19 depicts an example user interface generated by a data analysis and reporting tool that provides an administrator portal for displaying file signatures of files collected according to a specification provided by a user.

FIG. 19 depicts an example user interface generated by a data analysis and reporting tool that provides an administrator portal for displaying file signatures 1920 of files collected according to a specification provided by a user. The depicted example shows a list of file signatures 1920 of the files that have been collected for a user who requested a collection of data files from a "Recycle Bin," as indicated using a pointer 1930. The depicted example was generated based on a test case and it is provided to merely illustrate a particular application of the data analysis and reporting tool.

Referring again to FIG. 13, in step 1308, a user selects report chart options. The report chart options may include various options for selecting the format and types of the charts in which the collected data and data files are to be presented to the user. FIGS. 20-23 depict selecting one or more report chart options.

Figure 20:
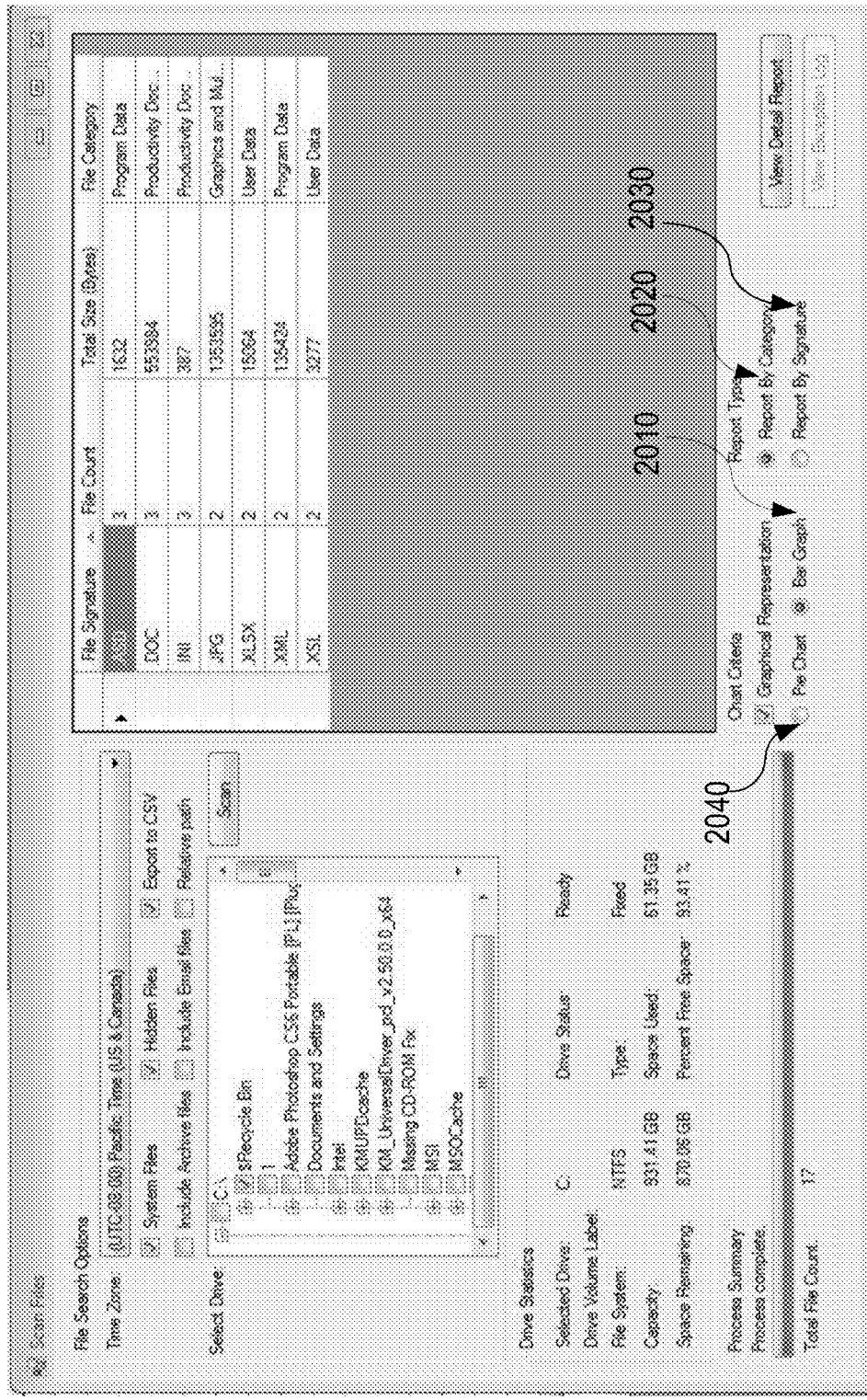
FIG. 20 depicts an example user interface generated by a data analysis and reporting tool that provides an administrator portal that for specifying chart types.

FIG. 20 depicts an example user interface generated by a data analysis and reporting tool that provides an administrator portal that for specifying chart types. In the depicted example, a user may select that he wishes to receive a graphical representation of the collected data and data files, and/or to receive a report of the collected data and data files organized either by a category or by a signature of the data files. Selection of the graphical representation may also include various types of the graphs, including pie charts and bar graphs. For example, if a user selected a bar graph option 2010 and a report type by category 2020, then the report generated for a user may include a graphical summary of the information about the collected data and data files organized by a category and represented as in a bar graph. Example of a summary report generated in response to the above selections made by a user is depicted in FIG. 21.

Figure 21:
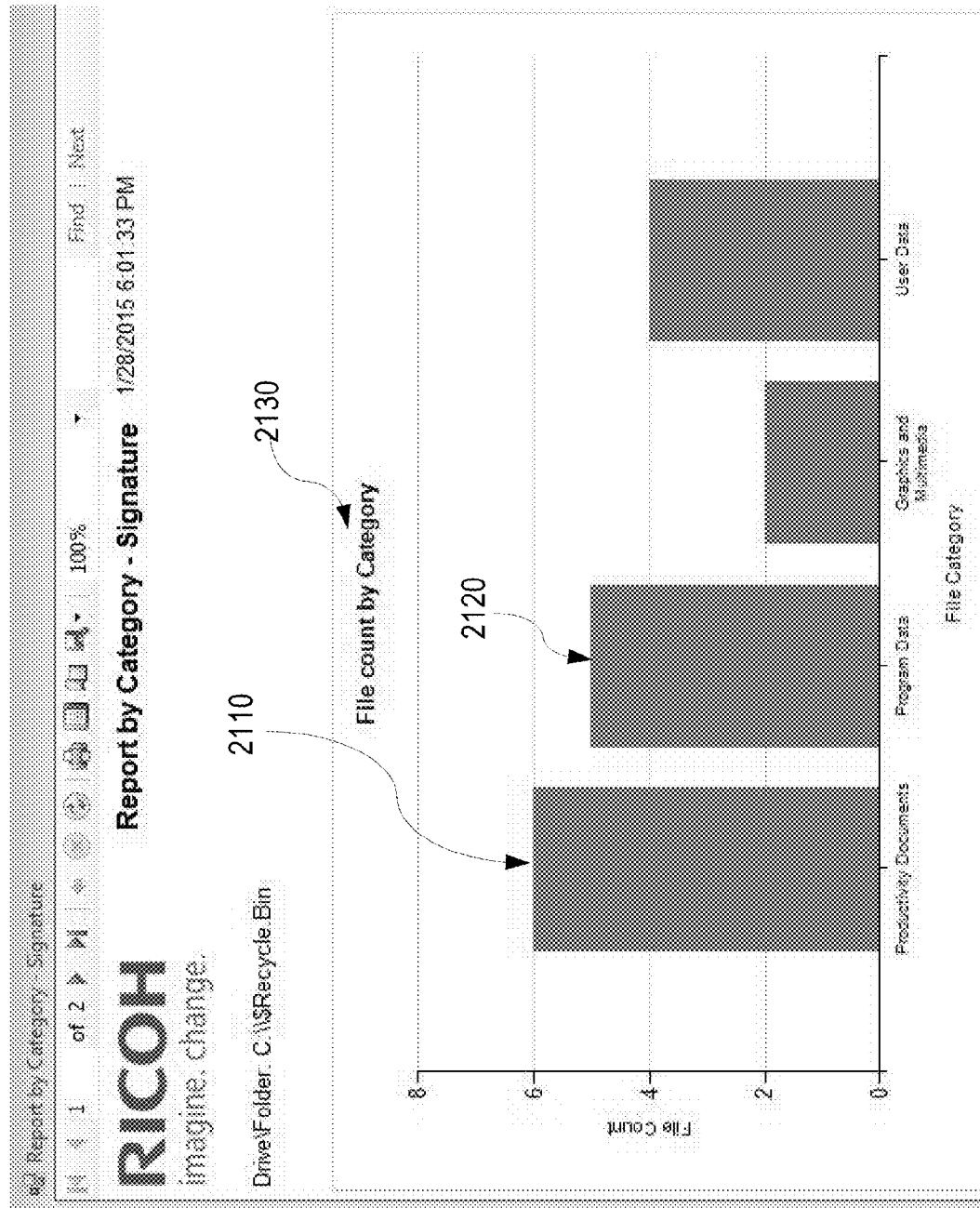
FIG. 21 depicts an example report generated by a data analysis and reporting tool that shows a summary report organized by signatures and represented as a bar chart.

FIG. 21 depicts an example report generated by a data analysis and reporting tool that shows a summary report 2130 organized by a category and represented as a bar chart. To generate a report depicted in FIG. 21, a user selects that he wishes to receive a graphical representation of the collected data and data files, and/or to receive a report of the collected data and data files organized by a category of the data files. The depicted report example shows bars, such as a bar 2110 and a bar 2120, which represent counts of the files that have been categorized as "productivity documents," and "program data," respectively.

Figure 22:
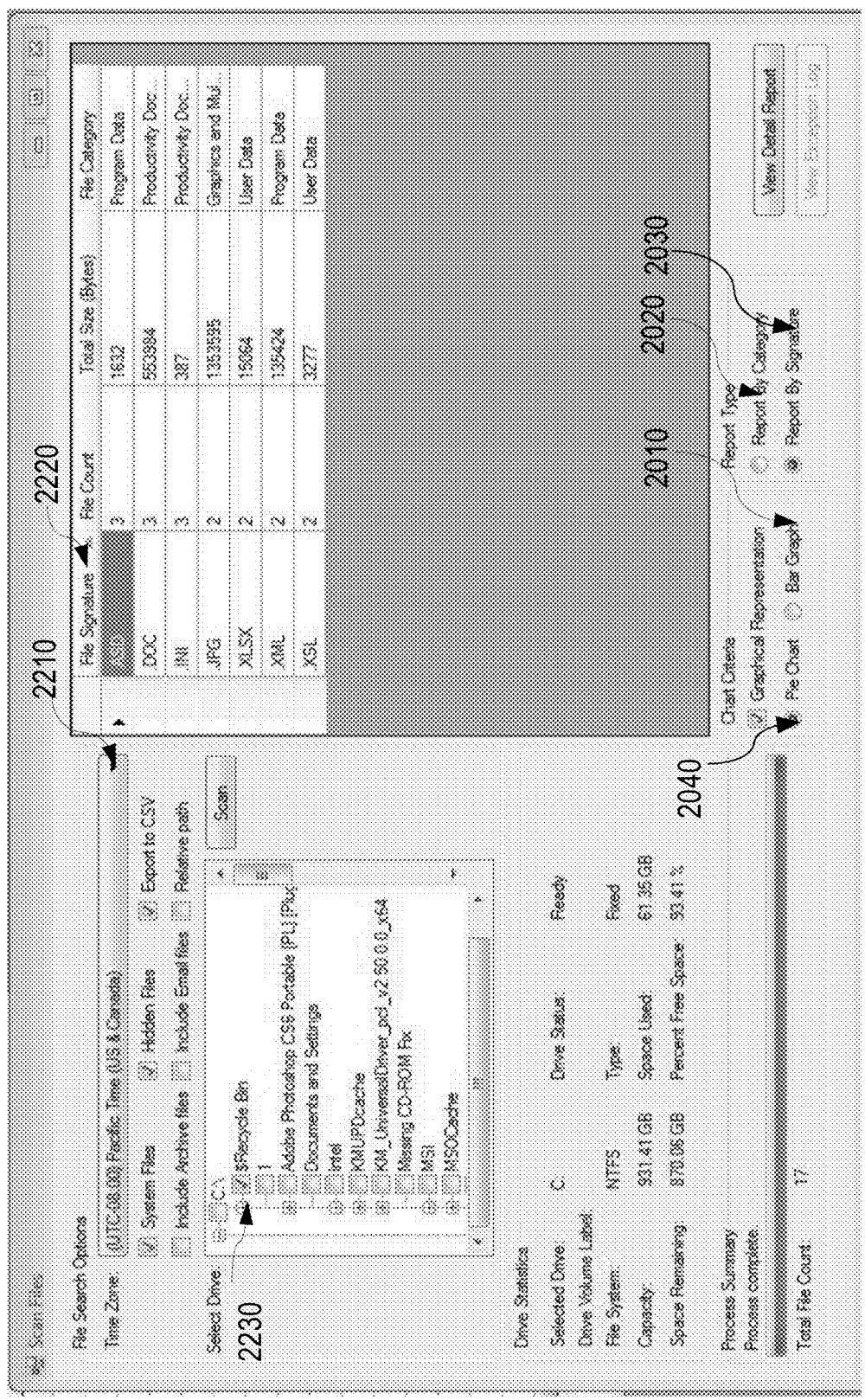
FIG. 22 depicts an example report generated by a data analysis and reporting tool that that provides an administrator portal that for specifying chart types.

FIG. 22 depicts an example report generated by a data analysis and reporting tool that that provides an administrator portal that for specifying chart types. In the depicted example, a user may select a pie chart option 2040 and a report by a category option 2020, or a report by a signature option 2030. Examples of a summary reports generated in response to the above selection made by a user is depicted in FIG. 23-24.

Figure 23:
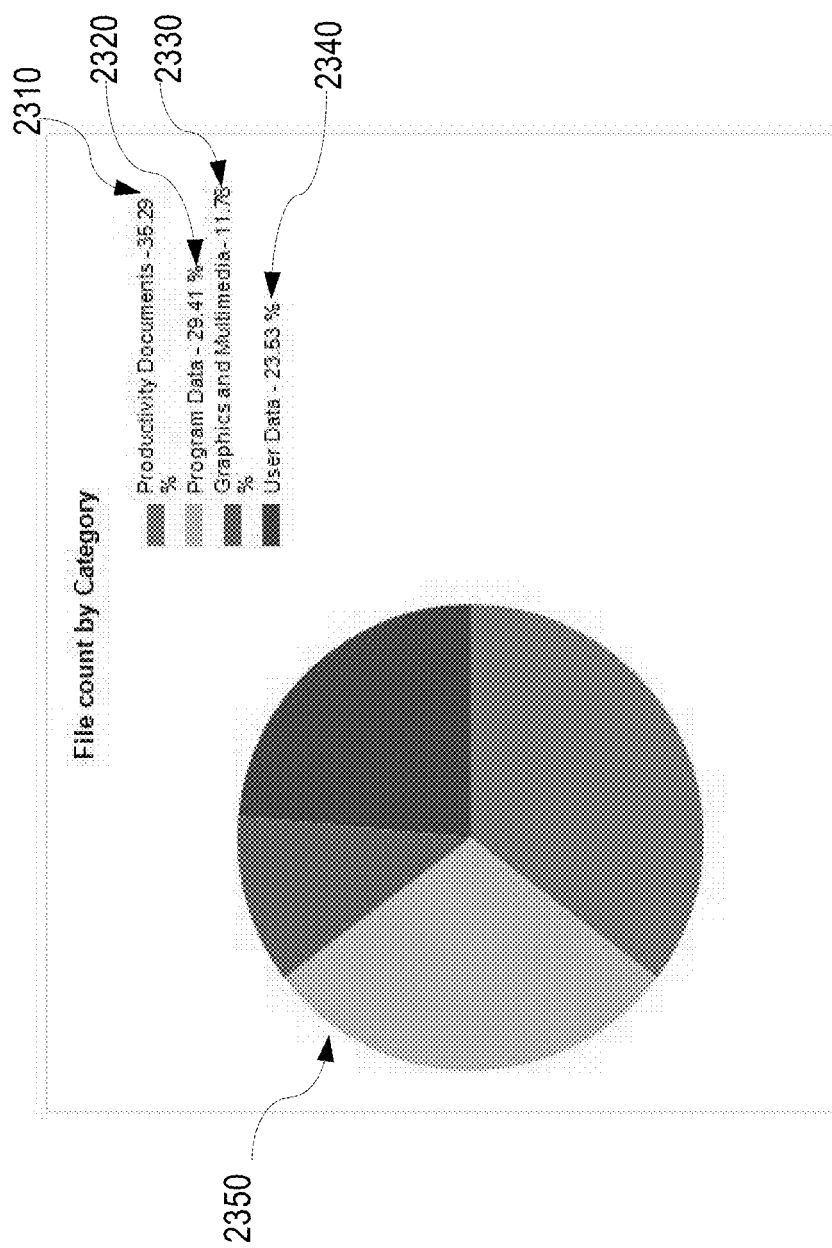
FIG. 23 depicts an example report generated by a data analysis and reporting tool that shows a summary report organized by a file count per category and represented as a pie chart.

FIG. 23 depicts an example report generated by a data analysis and reporting tool that shows a summary report 2350 organized by a file count per category and represented as a pie chart. The depicted example was generated based on a particular set of data collected from a particular computer resources. In the depicted example, a pie chart summary report 2350 contains four sections. The first section corresponds to productivity documents 2310; the section corresponds to program data 2320; the third section corresponds to graphics and multimedia documents 2330; and the fourth section corresponds to user data 2340. In the depicted example, the first section corresponding to productivity documents 2310 constituted about 35.29% of all collected documents; the second section corresponding to program data 2320 constituted about 29.41% of all collected documents; the third section corresponding to graphics and multimedia documents 2330 constituted about 11.76% of all collected documents; and the fourth section corresponding to user data 2340 constituted about 23.53% of all documents.

Figure 24:
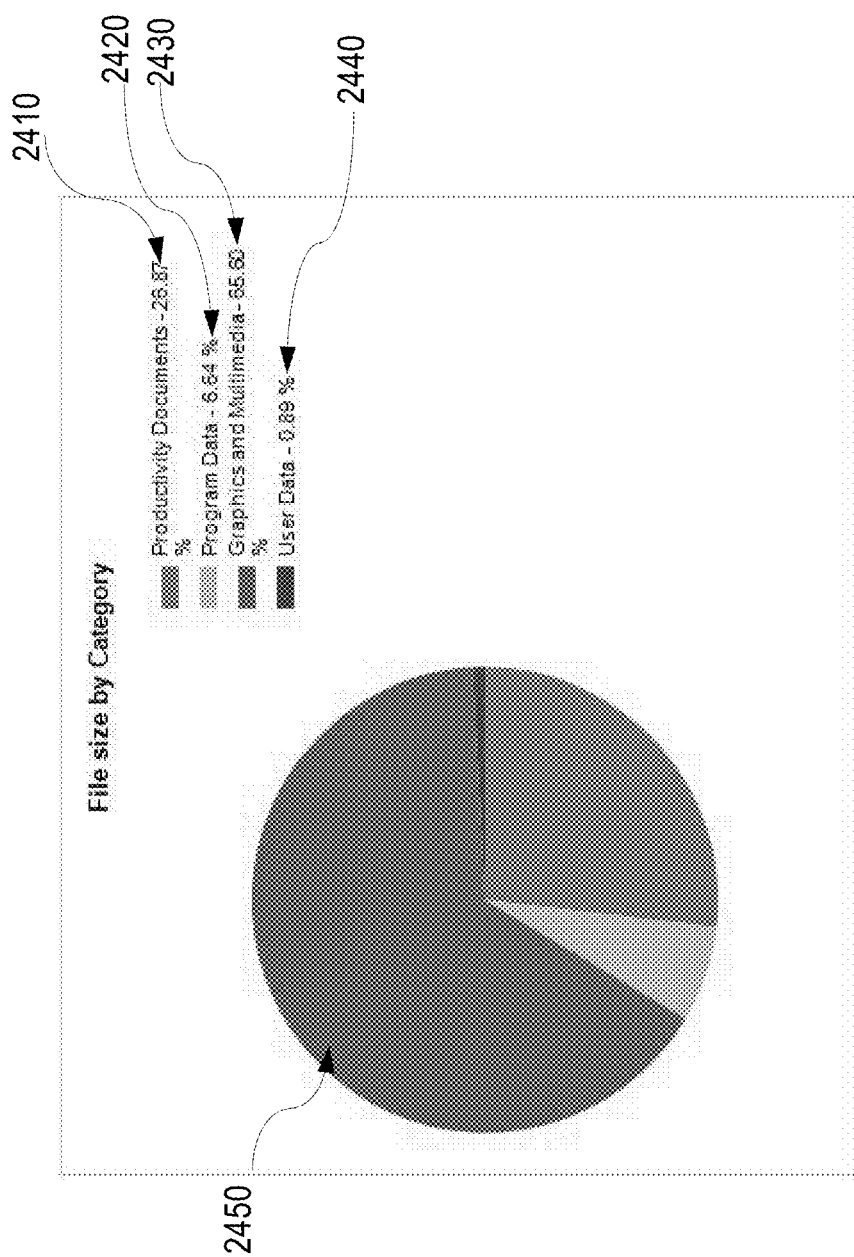
FIG. 24 depicts an example report generated by a data analysis and reporting tool that shows a summary report organized by a file size per category and represented as a pie chart.

FIG. 24 depicts an example report generated by a data analysis and reporting tool that shows a summary report organized by a file size per category and represented as a pie chart. The depicted example was generated based on a particular set of data collected from a particular computer resources. In the depicted example, a pie chart summary report 2450 contains four sections. The first section corresponds to productivity documents 2410; the section corresponds to program data 2420; the third section corresponds to graphics and multimedia documents 2430; and the fourth section corresponds to user data 2440. In the depicted example, the first section corresponding to productivity documents 2410 constituted about 26.87% of all collected documents; the second section corresponding to program data 2420 constituted about 6.64% of all collected documents; the third section corresponding to graphics and multimedia documents 2430 constituted about 65.60% of all collected documents; and the fourth section corresponding to user data 2440 constituted about 0.89% of all documents.

According to another example, a user may select a report by a signature option 2030. An example of a summary reports generated in response to the above selection made by a user is depicted in FIG. 25.

FIG. 25 depicts an example report generated by a data analysis and reporting tool that shows a summary report organized by a signature. In the depicted example, summary report 2550 has been generated from collected data and data files and organized by a file signature embedded in the respective files. Benefits of relying on file signatures embedded in the files, instead of relying merely on file extensions included in the names of the files, are described above.

In the depicted example summary report 2550, a first column identifies file signatures, such as a signature for *.ASD 2510, a signature for *.DOC 2520, a signature *.INI 2530, a signature *.JPG 2540, and the like. For each signature type, summary report 2550 shows the name of the respective file category, the count of files within each category, file sizes in bytes, file sized in megabytes, and the like.

Referring again to FIG. 13, in step 1310, a user may select whether a log for a collector is to be created as the collector is executed. A log may be desirable when a collection of data and data files is complex and there is a probability that a collector may generate information useful to validate the correctness of the collection. A log may be reviewed by users of requestor 110 and/or users of data collection service 130 to validate the search results, information about the collected data and data files, and troubleshoot settings for a collector if the collected data and data files do not meet the expectations of requestor 110 and data collection service 130.

In step 1312, data analysis and reporting tool 1300 creates and deploys a collector. Various ways of creating and deploying a collector are described in FIGS. 7-8.

In an embodiment, information provided or selected by a user is used to generate collection definition data, also referred to as a collection specification. Collection definition data may include specifications of the types of data to be collected, specifications of the resources from which the data is to be collected, specifications of the destinations at which the collected data is to be stored, specification of the types of reports that are requested, and the like.

In an embodiment, data analysis and reporting tool 1300 creates and deploys a collector that is configured to collect data and data files are requested by a user. More specifically, if data analysis and reporting tool 1300 is used by a user of a data collection service, then the tool uses the collection definition data to generate a collector, and deploys the collector for performing the collection of the data and files. However, if the data analysis and reporting tool is used by a user of requestor system 110, then the tool either uses the collection definition data to generate and deploy a collector or communicates the collection definition data to data collection service 130 for data collection service 130 to generate and deploy a collector.

In step 1314, data analysis and reporting tool 1300 receives an indication that a collector completed collecting data and data files from target system 120, and allows a user to select export options for exporting reports generated based on the collected data. This step may also be performed concurrently with step 1306, as a selection of the export option may be performed prior to deployment of a collector.

Reports generated based on the collected data and data files may be exported using different data formats. For example, a report may be formatted in accordance with the CSV format, described above.

In an embodiment, a user selects an option for exporting reports in the CSV format. This may be accomplished when the user selects an option button 1710 depicted in FIG. 17.

In step 1316, upon selecting for example, option button 1710 depicted in FIG. 17, the system generates a data structure (also referred to as a container) that is compatible with the CSV format, places the records containing the report data into the container, and exports a CSV file in the CSV format to a recipient or a requestor.

In an embodiment, records or fields of a CSV-compatible container may be separated by a comma or any other separator. An example of a hardcopy of a report exported in the CSV format is depicted in FIG. 26.

Figure 26:
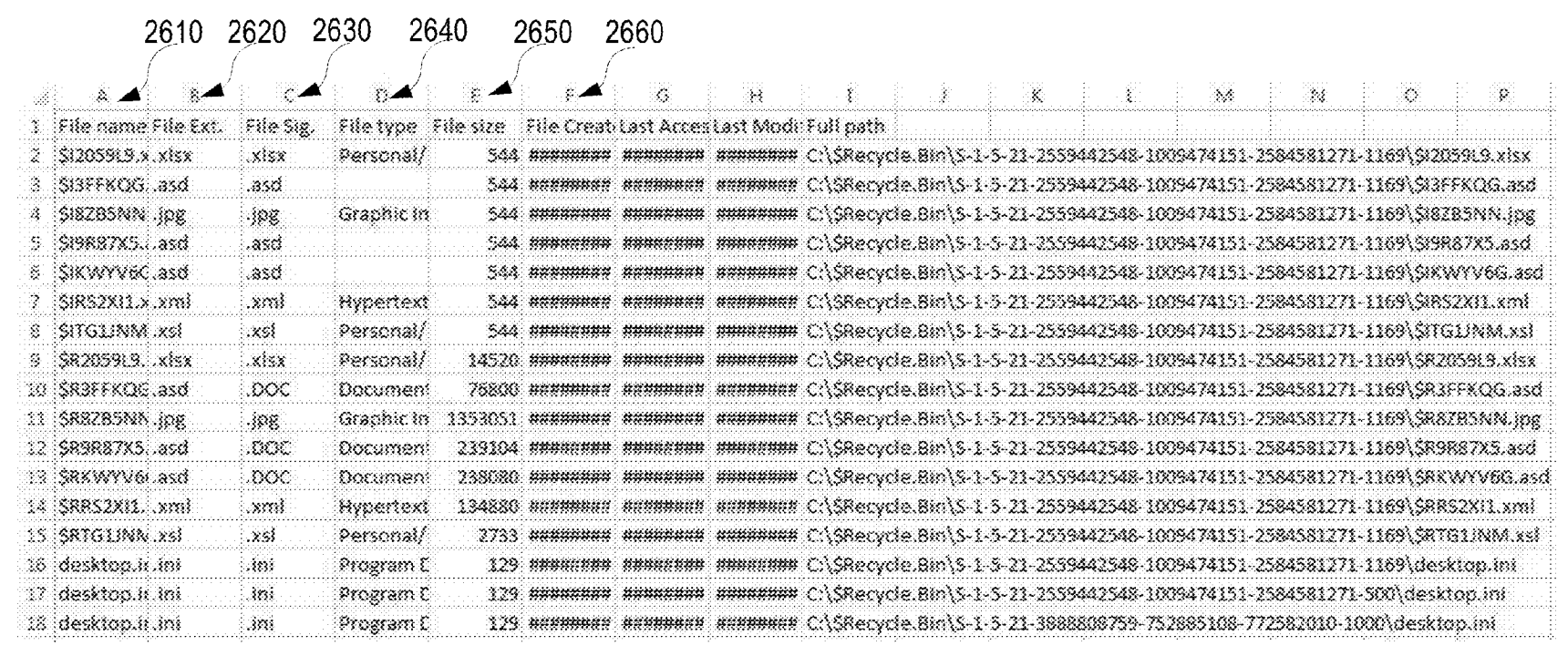

FIG. 26 depicts an example report generated by a data analysis and reporting tool that shows a comma-separated-values (CSV) file. The depicted example shows one of many ways of representing report data in the CSV data file. In the depicted example, record data are separated by a comma, and each record has the same count of fields. The count of fields may depend of the implementation of the data analysis and reporting tool. The contents of the records may depend on the results delivered by the data analysis and collection tool In the depicted example, a CSV file contains eighteen records (rows) of data; however, the count of the records and the contents of the records may vary and depend on the implementation of the tool and the results provided by the tool.

In an embodiment, each row in a CSV file contains a plurality of fields. Non-limiting examples of some fields include a file name field 2610, a file extension field 2620, a file signature field 2630, a file type field 2640, a file size field 2650, a file creation date field 2660, and the like. Data of each record in the CSV files are stored in the fields as depicted in FIG. 26. Other methods of organizing a CSV file may also be implemented. Furthermore, other methods of exporting report information about the collected data and the data files may also be implemented.

In an embodiment, collected data and data files are exported to a requestor and/or a recipient. For example, the collected data and data files may be exported to a user of requestor 110 and/or a user of data collection service 130.

In step 1318, data analysis and reporting tool 1300 generates a notification to a requestor and/or to data collection service 130. For example, data analysis and reporting tool 1300 may generate an electronic message to notify a user of requestor 110 to indicate that the requested data and data files have been collected and stored in network storage services 140. The electronic message may also indicate to the user a location at which the collected data and data files have been stored and may indicate that reports are ready and available to review by the user.

Additionally, or alternatively, data analysis and reporting tool 1300 may display the reports that the user requested. For example, data analysis and reporting tool 1300 may automatically display one or more report requested by the user as soon as the collection of the requested data and data files from computer resources of target system 120 is completed. Examples of various reports generated based on the collected data and data files are described in FIG. 21 and FIG. 23-25.

In an embodiment, data analysis and reporting tool 1300 also generates a notification to a user of data collection service 130 to notify the user that that the requested data and data files have been collected and stored in network storage services 140. The electronic message may also indicate to the user a location at which the collected data and data files have been stored and may indicate that reports are ready and available to review by the user. Furthermore, the electronic message may indicate that reports requested by the user are available. Alternatively, the reports may be available to the user and displayed for the user automatically once the collection of the requested data and data files is completed.

In an embodiment, an approach is presented for collecting electronic data and data files from target systems for the purpose of performing any type of data discovery, including legal discovery, audit requests, and the like. For example, in some cases the electronic data and data files may be collected from target systems when the data is requested for legal discovery purposes; in some other cases, the data may be collected when the data is requested for corporate and individual audit purposes, including audits instigated by governmental agencies. Collecting of the electronic data and data files is performed in a selective manner, which allows collecting only the requested data and data files, not all data from computer resources from target devices.

The approach also allows storing the collected data and data files in any network storage system, including cloud systems hosted in a distributed network of servers.

Furthermore, the approach allows performing legal discovery preserving the integrity and security of the collected data. For example, the approach allows performing the data collection independently and without an actual involvement of the interested party.

Moreover, the approach may be implemented in a system that can be accessed automatically or by individuals who do not need to demonstrate any specialized knowledge and experience in performing legal discovery.

In an embodiment, a data analysis and reporting tool is presented that allows generating a variety of reports based on the collected data and data files, and that allows customizing the reports in a variety of ways. The broad capabilities of the tool leads to providing a user with a satisfactory user experience and confidence about the integrity and security of the collected data.

VII. Implementation Mechanisms

Although the flow diagrams of the present application depict a particular set of steps in a particular order, other implementations may use fewer or more steps, in the same or different order, than those depicted in the figures.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 27:
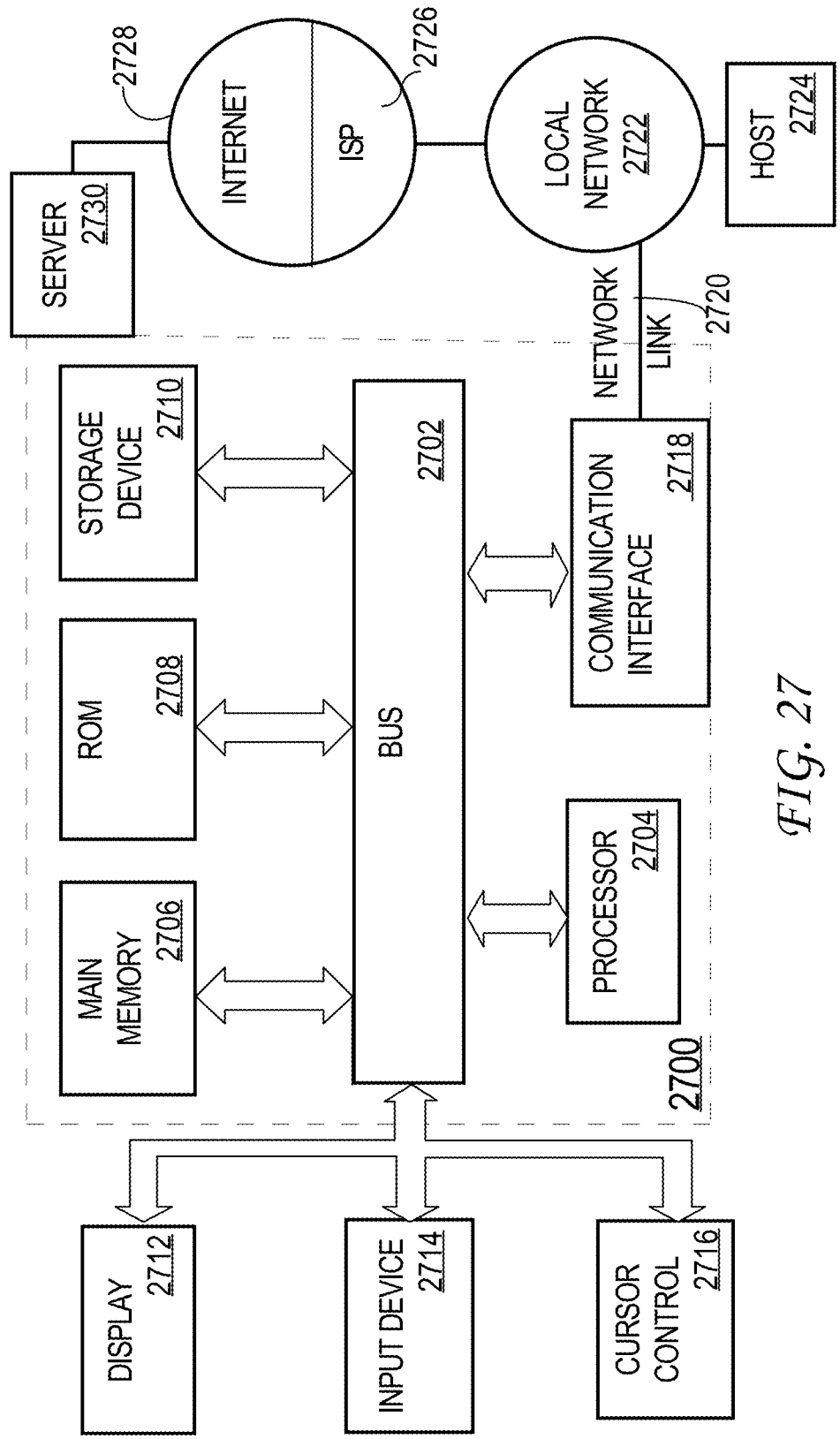
FIG. 27 is a block diagram of a computer system on which embodiments may be implemented.

FIG. 27 is a block diagram that depicts an example computer system 2700 upon which embodiments may be implemented. Computer system 2700 includes a bus 2702 or other communication mechanism for communicating information, and a processor 2704 coupled with bus 2702 for processing information. Computer system 2700 also includes a main memory 2706, such as a random access memory (RAM) or other dynamic storage device, coupled to bus 2702 for storing information and instructions to be executed by processor 2704. Main memory 2706 also may be used for storing temporary variables or other intermediate information during execution of instructions to be executed by processor 2704. Computer system 2700 further includes a read only memory (ROM) 2708 or other static storage device coupled to bus 2702 for storing static information and instructions for processor 2704. A storage device 2710, such as a magnetic disk or optical disk, is provided and coupled to bus 2702 for storing information and instructions.

Computer system 2700 may be coupled via bus 2702 to a display 2712, such as a cathode ray tube (CRT), for displaying information to a computer user. Although bus 2702 is illustrated as a single bus, bus 2702 may comprise one or more buses. For example, bus 2702 may include without limitation a control bus by which processor 2704 controls other devices within computer system 2700, an address bus by which processor 2704 specifies memory locations of instructions for execution, or any other type of bus for transferring data or signals between components of computer system 2700.

An input device 2714, including alphanumeric and other keys, is coupled to bus 2702 for communicating information and command selections to processor 2704. Another type of user input device is cursor control 2716, such as a mouse, a trackball, or cursor direction keys for communicating direction information and command selections to processor 2704 and for controlling cursor movement on display 2712. This input device typically has two degrees of freedom in two axes, a first axis (e.g., x) and a second axis (e.g., y), that allows the device to specify positions in a plane.

Computer system 2700 may implement the techniques described herein using customized hard-wired logic, one or more ASICs or FPGAs, firmware and/or program logic or computer software which, in combination with the computer system, causes or programs computer system 2700 to be a special-purpose machine. According to one embodiment, those techniques are performed by computer system 2700 in response to processor 2704 executing one or more sequences of one or more instructions contained in main memory 2706. Such instructions may be read into main memory 2706 from another computer-readable medium, such as storage device 2710. Execution of the sequences of instructions contained in main memory 2706 causes processor 2704 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 2700, various computer-readable media are involved, for example, in providing instructions to processor 2704 for execution. Such a medium may take many forms, including but not limited to, non-volatile media and volatile media. Non-volatile media includes, for example, optical or magnetic disks, such as storage device 2710. Volatile media includes dynamic memory, such as main memory 2706. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 2704 for execution. For example, the instructions may initially be carried on a magnetic disk of a remote computer. The remote computer can load the instructions into its dynamic memory and send the instructions over a telephone line using a modem. A modem local to computer system 2700 can receive the data on the telephone line and use an infra-red transmitter to convert the data to an infra-red signal. An infra-red detector can receive the data carried in the infra-red signal and appropriate circuitry can place the data on bus 2702. Bus 2702 carries the data to main memory 2706, from which processor 2704 retrieves and executes the instructions. The instructions received by main memory 2706 may optionally be stored on storage device 2710 either before or after execution by processor 2704.

Computer system 2700 also includes a communication interface 2718 coupled to bus 2702. Communication interface 2718 provides a two-way data communication coupling to a network link 2720 that is connected to a local network 2722. For example, communication interface 2718 may be an integrated services digital network (ISDN) card or a modem to provide a data communication connection to a corresponding type of telephone line. As another example, communication interface 2718 may be a local area network (LAN) card to provide a data communication connection to a compatible LAN. Wireless links may also be implemented. In any such implementation, communication interface 2718 sends and receives electrical, electromagnetic or optical signals that carry digital data streams representing various types of information.

Network link 2720 typically provides data communication through one or more networks to other data devices. For example, network link 2720 may provide a connection through local network 2722 to a host computer 2724 or to data equipment operated by an Internet Service Provider (ISP) 2726. ISP 2726 in turn provides data communication services through the world wide packet data communication network now commonly referred to as the "Internet" 2728. Local network 2722 and Internet 2728 both use electrical, electromagnetic or optical signals that carry digital data streams.

Computer system 2700 can send messages and receive data, including program code, through the network(s), network link 2720 and communication interface 2718. In the Internet example, a server 2730 might transmit a requested code for an application program through Internet 2728, ISP 2726, local network 2722 and communication interface 2718. The received code may be executed by processor 2704 as it is received, and/or stored in storage device 2710, or other non-volatile storage for later execution.

In the foregoing specification, embodiments have been described with reference to numerous specific details that may vary from implementation to implementation. Thus, the sole and exclusive indicator of what is, and is intended by the applicants to be, the approach is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable storage media storing instructions which, when processed by one or more processors, cause:
   a data collection manager generating a graphical user interface (GUI) and displaying the GUI on a display of a client device;
   wherein the GUI includes a plurality of dialog boxes for receiving one or more user inputs;
   the data collection manager receiving one or more file type selections via one or more first dialog boxes from the plurality of dialog boxes;
   the data collection manager receiving one or more target selections via one or more second dialog boxes from the plurality of dialog boxes; and
   the data collection manager generating and deploying a collector configured to:
      selectively determine one or more data files that have certain characteristics specified by the one or more file type selections, and that are hosted on one or more target devices specified by the one or more target selections;
      collect the one or more data files from the one or more target devices; and
      store the one or more data files in a network server.

2. The one or more non-transitory computer-readable storage media of claim 1,
   wherein the one or more file type selections include one or more of: document files, image files, spreadsheet files, attachments, system files, hidden files, archive files, or email files;
   wherein the one or more data files are selected by the collector if their respective file signatures match any of the one or more file type selections; and
   wherein a signature of a file is a unique code embedded in the file.

3. The one or more non-transitory computer-readable storage media of claim 1, further comprising additional instructions which, when processed by the one or more processors, cause:
   the data collection manager receiving one or more chart type selections via one or more third dialog boxes from the plurality of dialog boxes; and
   the data collection manager accessing the one or more data files stored by the collector in the network server, and generating a report that presents information about the one or more data files in a format specified by the one or more chart type selections.

4. The one or more non-transitory computer-readable storage media of claim 1, further comprising additional instructions which, when processed by the one or more processors, cause:
   the data collection manager receiving one or more report type selections via one or more fourth dialog boxes from the plurality of dialog boxes; and
   the data collection manager accessing the one or more data files stored by the collector in the network server, and generating a report that presents information about the one or more data files in a format specified by the one or more report type selections.

5. The one or more non-transitory computer-readable storage media of claim 1, further comprising additional instructions which, when processed by the one or more processors, cause:
   the data collection manager receiving a detail report selection via a fourth dialog box from the plurality of dialog boxes; and
   the data collection manager accessing the one or more data files stored by the collector in the network server, and generating a detail report that presents information about the one or more data files in a format specified by the detail report selection.

6. The one or more non-transitory computer-readable storage media of claim 1, further comprising additional instructions which, when processed by the one or more processors, cause:
   the data collection manager receiving one or more data export selections via one or more sixth dialog boxes from the plurality of dialog boxes; and
   the data collection manager accessing the one or more data files stored by the collector in the network server, and exporting the one or more data files according to the one or more data export selections.

7. The one or more non-transitory computer-readable storage media of claim 1, further comprising additional instructions which, when processed by the one or more processors, cause:
   the data collection manager receiving one or more view log selections via one or more fifth dialog boxes from the plurality of dialog boxes; and
   the data collection manager configuring the collector to generate one or more logs about collecting the one or more data files as specified by the one or more view log selections.

8. A method for collecting data and data files from computer resources of a target system using a data analysis and reporting tool, the method comprising:
   generating a graphical user interface (GUI) and displaying the GUI on a display of a client device;
   wherein the GUI includes a plurality of dialog boxes for receiving one or more user inputs;
   receiving one or more file type selections via one or more first dialog boxes from the plurality of dialog boxes;
   receiving one or more target selections via one or more second dialog boxes from the plurality of dialog boxes; and
   generating and deploying a collector configured to:
      selectively determine one or more data files that have certain characteristics specified by the one or more file type selections, and that are hosted on one or more target devices specified by the one or more target selections;
      collect the one or more data files from the one or more target devices; and
      store the one or more data files in a network server.

9. The method of claim 8,
   wherein the one or more file type selections include one or more of: document files, image files, spreadsheet files, attachments, system files, hidden files, archive files, or email files;
   wherein the one or more data files are selected by the collector if their respective file signatures match any of the one or more file type selections; and
   wherein a signature of a file is a unique code embedded in the file.

10. The method of claim 8, further comprising:
   receiving one or more chart type selections via one or more third dialog boxes from the plurality of dialog boxes; and
   accessing the one or more data files stored by the collector in the network server, and generating a report that presents information about the one or more data files in a format specified by the one or more chart type selections.

11. The method of claim 8, further comprising:
receiving one or more report type selections via one or more fourth dialog boxes from the plurality of dialog boxes; and
accessing the one or more data files stored by the collector in the network server, and generating a report that presents information about the one or more data files in a format specified by the one or more report type selections.

12. The method of claim 8, further comprising:
receiving a detail report selection via a fourth dialog box from the plurality of dialog boxes; and
accessing the one or more data files stored by the collector in the network server, and generating a detail report that presents information about the one or more data files in a format specified by the detail report selection.

13. The method of claim 8, further comprising:
receiving one or more data export selections via one or more sixth dialog boxes from the plurality of dialog boxes; and
accessing the one or more data files stored by the collector in the network server, and exporting the one or more data files according to the one or more data export selections.

14. The method of claim 8, further comprising:
receiving one or more view log selections via one or more fifth dialog boxes from the plurality of dialog boxes; and
configuring the collector to generate one or more logs about collecting the one or more data files as specified by the one or more view log selections.

15. A computer-implemented data analysis and reporting system comprising:
a collector configured to perform a computerized legal discovery;
a data collection manager configured to:
generating a graphical user interface (GUI) and displaying the GUI on a display of a client device;
wherein the GUI includes a plurality of dialog boxes for receiving one or more user inputs;
receiving one or more file type selections via one or more first dialog boxes from the plurality of dialog boxes;
receiving one or more target selections via one or more second dialog boxes, from the plurality of dialog boxes; and
generating and deploying a collector configured to:
selectively determine one or more data files that have certain characteristics specified by the one or more file type selections, and that are hosted on one or more target devices specified by the one or more target selections;
collect the one or more data files from the one or more target devices; and
store the one or more data files in a network server.

16. The computer-implemented data analysis and reporting system of claim 15,
wherein the one or more file type selections include one or more of: document files, image files, spreadsheet files, attachments, system files, hidden files, archive files, or email files;
wherein the one or more data files are selected by the collector if their respective file signatures match any of the one or more file type selections; and
wherein a signature of a file is a unique code embedded in the file.

17. The computer-implemented data analysis and reporting system of claim 15, wherein a data collection manager is further configured to:
receiving one or more chart type selections via one or more third dialog boxes from the plurality of dialog boxes; and
accessing the one or more data files stored by the collector in the network server, and generating a report that presents information about the one or more data files in a format specified by the one or more chart type selections.

18. The computer-implemented data analysis and reporting system of claim 15, wherein a data collection manager is further configured to:
receiving one or more report type selections via one or more fourth dialog boxes from the plurality of dialog boxes; and
accessing the one or more data files stored by the collector in the network server, and generating a report that presents information about the one or more data files in a format specified by the one or more report type selections.

19. The computer-implemented data analysis and reporting system of claim 15, wherein a data collection manager is further configured to:
receiving a detail report selection via a fourth dialog box from the plurality of dialog boxes; and
accessing the one or more data files stored by the collector in the network server, and generating a detail report that presents information about the one or more data files in a format specified by the detail report selection.

20. The computer-implemented data analysis and reporting system of claim 15, wherein a data collection manager is further configured to:
receiving one or more data export selections via one or more sixth dialog boxes from the plurality of dialog boxes; and
accessing the one or more data files stored by the collector in the network server, and exporting the one or more data files according to the one or more data export selections.

* * * * *